(12) United States Patent
Iizuka et al.

(10) Patent No.: US 6,863,050 B2
(45) Date of Patent: Mar. 8, 2005

(54) APPARATUS AND METHOD FOR CONTROLLING INTAKE AIR AMOUNT OF INTERNAL COMBUSTION ENGINE

(75) Inventors: Isamu Iizuka, Atsugi (JP); Kenichi Machida, Atsugi (JP)

(73) Assignee: Hitachi Unisia Automotive, Ltd., Atsugi (JP)

( * ) Notice: Subject to any disclaimer, the term of this patent is extended or adjusted under 35 U.S.C. 154(b) by 62 days.

(21) Appl. No.: 10/617,785

(22) Filed: Jul. 14, 2003

(65) Prior Publication Data
US 2004/0007194 A1 Jan. 15, 2004

(30) Foreign Application Priority Data
Jul. 15, 2002 (JP) ........................................ 2002-205876

(51) Int. Cl.[7] .............................................. F02D 13/00
(52) U.S. Cl. ....................... 123/345; 123/346; 123/347; 123/319
(58) Field of Search ................................ 123/319, 330, 123/344, 345, 346, 347, 348

(56) References Cited

U.S. PATENT DOCUMENTS 6,178,943 B1 * 1/2001 Taga et al. .................. 123/295

FOREIGN PATENT DOCUMENTS

| JP | 2001-041013 A | 2/2001 |
| JP | 2001-271665 A | 10/2001 |

\* cited by examiner

Primary Examiner—Bibhu Mohanty
(74) Attorney, Agent, or Firm—Foley & Lardner LLP

(57) ABSTRACT

In an internal combustion engine provided with a variable valve mechanism that varies at least a valve operating characteristic (valve lift amount and the like) of an intake valve, a target intake air amount equivalent to a target torque is set based on operating conditions of the engine, to calculate a target volume flow ratio by dividing the target intake air amount by an engine rotation speed and total cylinder volume. The target volume flow ratio is corrected according to closing timing of the intake valve. If the valve lift amount of the intake valve is in a low valve lift region, the target volume flow ratio is further corrected according to the valve lift amount, and the post corrected target volume flow ratio is converted into a valve opening area of the intake valve to be set as a target valve opening area. Then, based on the target valve opening area, a target valve operating characteristic of the intake valve is set. Thereafter, the variable valve mechanism is controlled so that the valve operating characteristic of the intake valve reaches the target valve operating characteristic.

15 Claims, 19 Drawing Sheets

(b-2) SETTING OF VALVE UPSTREAM PRESSURE BASED CORRECTION VALUE "KMANIP"

(c) SETTING OF VTC TARGET (PHASE) ANGLE "TGVTC"

(d-1) SETTING OF TARGET THROTTLE OPENING "TDTVO"

(d-2) CALCULATION OF INTAKE VALVE OPENING BASED CORRECTION VALUE "KAVEL"

(d-3) CALCURATION OF PRESSURE RATIO(Pm1/Pa)
AT THE TIME WHEN VEL OPERATES

US 6,863,050 B2

APPARATUS AND METHOD FOR CONTROLLING INTAKE AIR AMOUNT OF INTERNAL COMBUSTION ENGINE

FIELD OF THE INVENTION

The present invention relates to a technique for controlling an intake air amount by a variable valve mechanism, which varies an operating characteristic of an intake valve of an engine.

RELATED ART OF THE INVENTION

Heretofore, there has been known a control apparatus, as disclosed in Japanese Unexamined Patent Publication No. 2001-271665, which controls an operating characteristic of an intake valve to thereby control an intake air amount (perform a so-called throttle-less operation).

In such a control apparatus, a target torque is calculated according to an engine operating condition and also a torque fluctuation amount of the engine is detected, and intake valve closing timing and a valve overlap amount of intake/exhaust valves are set so that an internal EGR rate becomes maximum within an allowable range of the torque fluctuation amount, thereby realizing the throttle-less operation which achieves both the intake air amount control and the reduction of emission.

In an internal combustion engine provided with a variable valve apparatus which varies a valve lift amount of an intake valve, it is required to consider an influence of the valve lift amount as follows, when performing an intake air amount control.

That is, if the valve lift amount of the intake valve becomes lower than a predetermined amount, since an air amount capable to be sucked (intake amount) is abruptly decreased, a "valve lift amount-intake amount characteristic" in "a low valve lift region" where the valve lift amount is lower than the predetermined amount is entirely different from that in "a high valve lift region" where the valve lift amount is equal to or higher than the predetermined amount. Therefore, it has been found that, in order to ensure an intake air amount requested according to an engine operating condition, the control of intake valve closing timing as in the conventional technique is not enough, and the valve operating characteristic needs to be set, considering the "valve lift amount-intake amount characteristic", that is, the influence of the valve lift amount on the intake amount.

SUMMARY OF THE INVENTION

The present invention has been achieved in view of the above problems and has an object to ensure, in an internal combustion engine provided with a variable valve mechanism which varies a valve lift amount of an intake valve, an intake air amount requested according to an engine operating condition, to thereby realize a high accurate throttle-less operation (an intake air amount control mainly by the variable valve mechanism).

In order to achieve the above object, according to the present invention, a constitution in which, in an internal combustion engine provided with a variable valve mechanism which varies at least an operating characteristic of an intake valve, an engine operation condition is detected by an engine operating condition detecting sensor, the operating characteristic of the intake valve is detected by a valve operating characteristic detecting sensor, a target intake air amount equivalent to a target torque is set according to the engine operating condition, a target valve operating characteristic for ensuring the target intake air amount is set, and the variable valve mechanism is controlled so that the operating characteristic of the intake valve reaches the target valve operating characteristic, is added with the following constitution.

A correction according to a valve lift amount of the intake valve is performed to set the target valve operating characteristic.

The other objects and features of this invention will become understood from the following description with accompanying drawings.

DETAILED DESCRIPTION OF THE EMBODIMENT

An embodiment of the present invention will be described based on the drawings.

Figure 1:
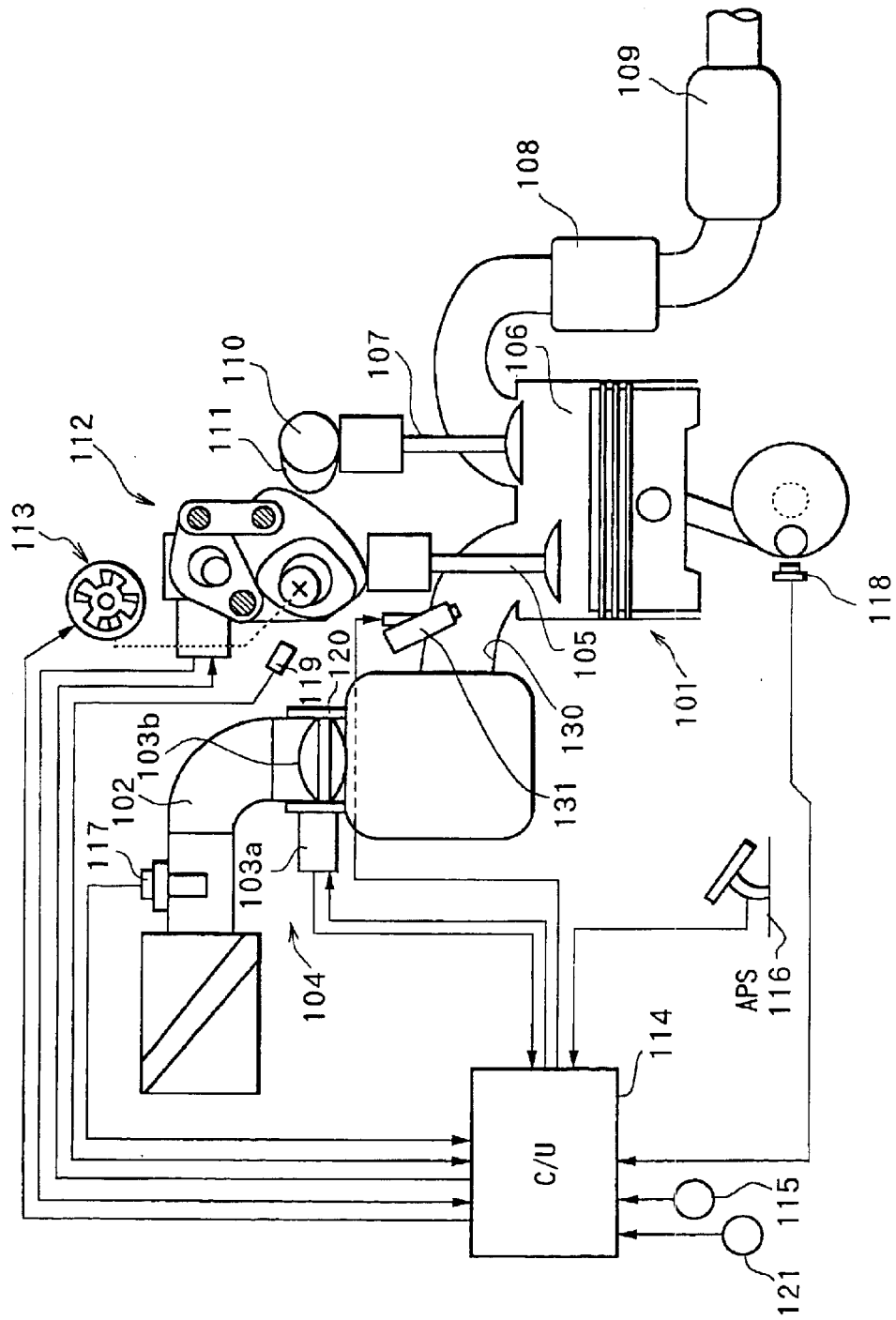
FIG. 1 is a view showing a system structure of an internal combustion engine in an embodiment of the present invention.

FIG. 1 is a structural diagram of an internal combustion engine for vehicle. In FIG. 1, in an intake passage 102 of an internal combustion engine 101, an electronically controlled throttle 104 is disposed for driving a throttle valve 103b to open and close by a throttle motor 103a. Air is sucked into a combustion chamber 106 via electronically controlled throttle 104 and an intake valve 105.

A combusted exhaust gas is discharged from combustion chamber 106 via an exhaust valve 107, purified by an exhaust purification catalyst 108, and then emitted into the atmosphere via a muffler 109.

Exhaust valve 107 is driven by a cam 111 axially supported by an exhaust side camshaft 110, while keeping a valve lift amount and a valve operating angle thereof constant. On the contrary, a valve lift amount and a valve operating angle of intake valve 105 are successively varied by a VEL (Variable valve Event and Lift mechanism) 112 serving as a variable valve mechanism, and valve timing thereof is successively varied by a VTC (Valve Timing Control mechanism) 113 serving as a variable valve timing mechanism. Further, the constitution may be such that an operating characteristic (valve lift amount, valve operating angle, valve timing) of exhaust valve 107 is varied together with an operating characteristic of intake valve 105.

A control unit (C/U) 114 incorporating therein a microcomputer, receives various detection signals from a water temperature sensor 115 detecting a cooling water temperature Tw of engine 101, an accelerator opening sensor APS 116 detecting an accelerator opening, an air flow meter 117 detecting an intake air amount (mass flow) Qa, a crank angle sensor 118 taking out a rotation signal from a crankshaft, a cam sensor 119 detecting a rotation position (phase angle) of an intake side camshaft, a throttle sensor 120 detecting an opening TVO of throttle valve 103b, a pressure sensor 121 detecting a pressure inside a cylinder and the like.

C/U 114 controls electronically controlled throttle 104, VEL 112 and VTC 113 based on received detection signals, so that target valve timing which is set according to an engine operating condition can be obtained, and also so that a target intake air amount corresponding to the accelerator opening can be obtained based on the opening of throttle valve 103b and the operating characteristic of intake valve 105.

Specifically, the opening of throttle valve 103b is controlled so as to generate a constant negative pressure (target Boost: for example, −50 mmHg) for the canister purging and the blowby gas processing, while controlling the intake air amount by controlling the valve lift amount (and the valve operating angle) of intake valve 105 by VEL 112.

Note, under an operating condition where there is no negative pressure request, the intake air amount is controlled only by VEL 112, while keeping throttle valve 103b fullopened. In the case where the intake air amount cannot be controlled only by VEL 112, the drive of VEL 112 is controlled and throttle valve 103b is also controlled.

In C/U 114, an engine rotation speed Ne is calculated based on the rotation signal output from crank angle sensor 118. Further, an electromagnetic fuel injection valve 131 is disposed on an intake port 130 on the upstream side of intake valve 105 of each cylinder. Fuel injection valve 131 injects fuel adjusted at a predetermined pressure toward intake valve 105 when driven to open by an injection pulse signal from C/U 114.

Here, a structure of VEL 112 will be described.

Figure 2:
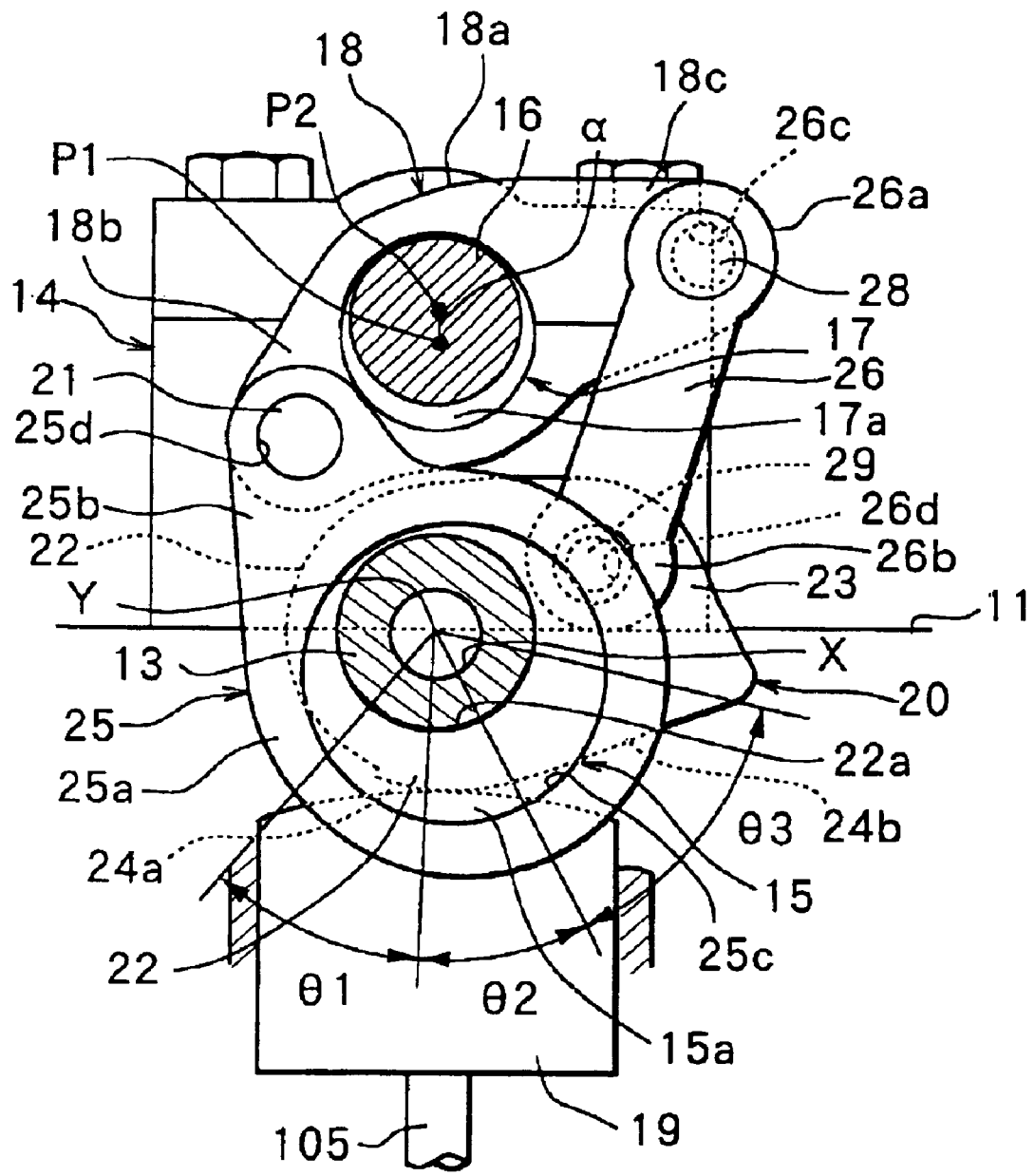
FIG. 2 is a cross section view showing a VEL serving as a variable valve mechanism in the embodiment (A—A cross section view of FIG. 3)
Figure 3:
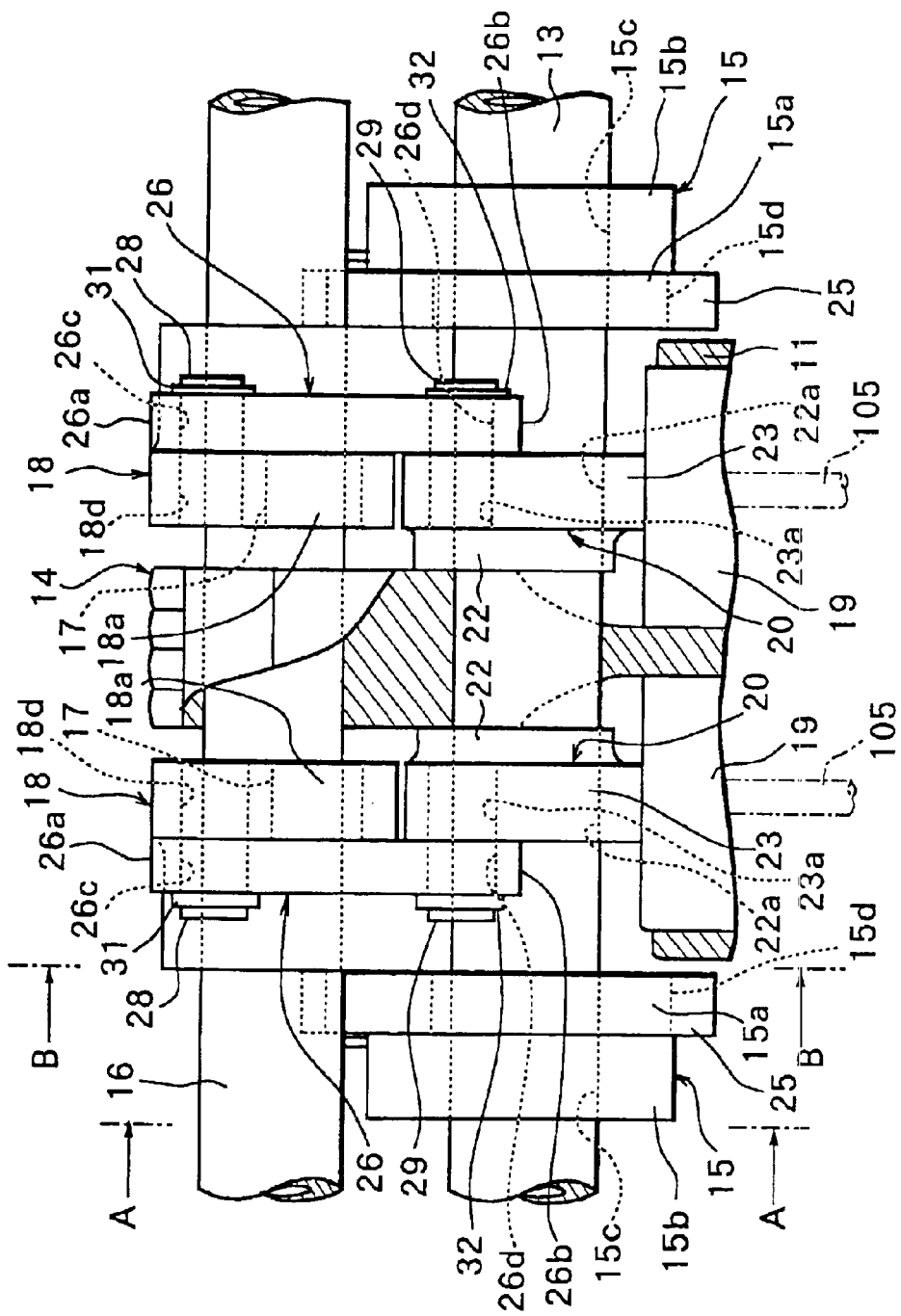
FIG. 3 is a side elevation view of the VEL.
Figure 4:
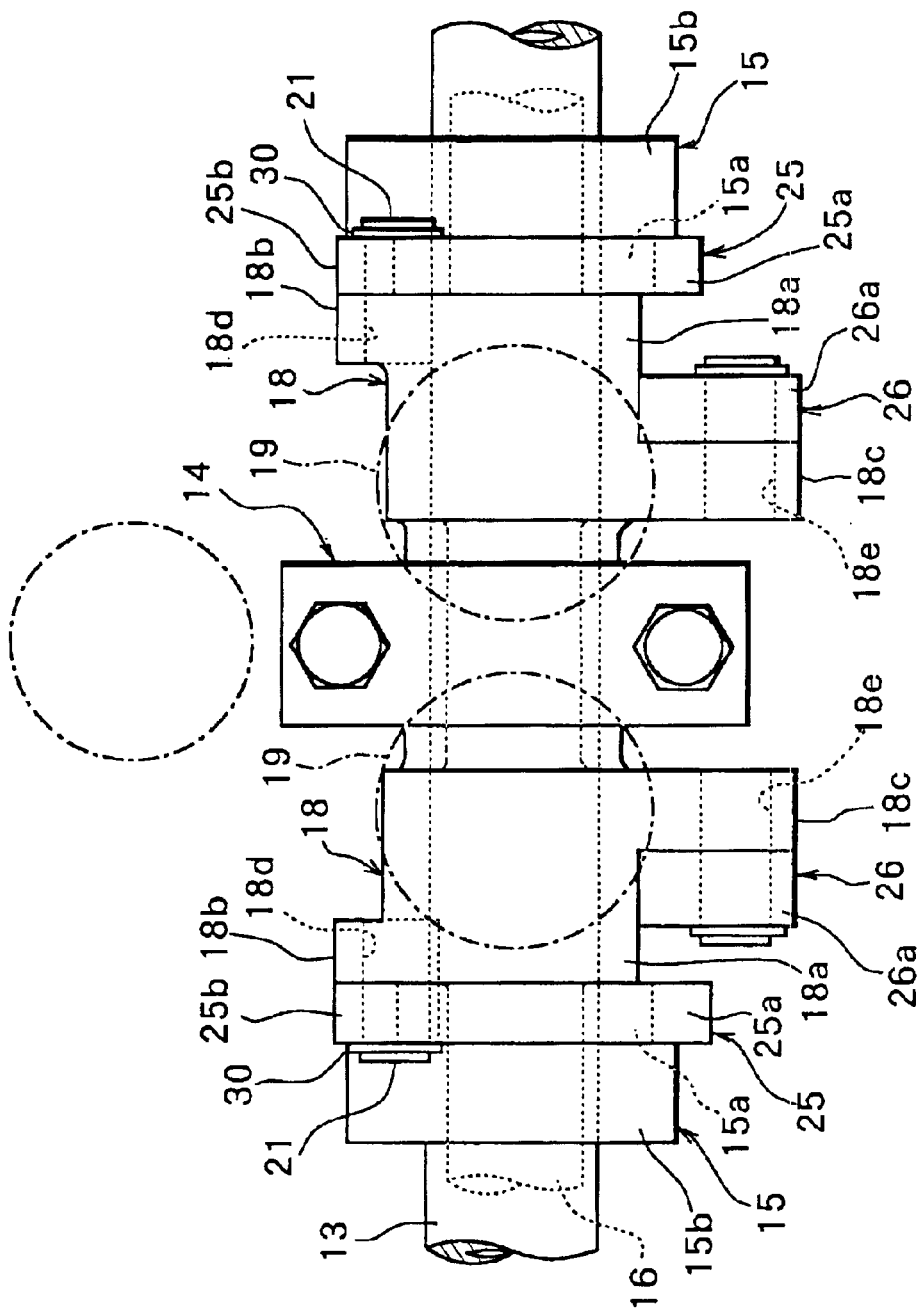
FIG. 4 is a top plan view of the VEL.

As shown in FIG. 2 to FIG. 4, VEL 112 includes a pair of intake valves 105, 105, a hollow camshaft 13 rotatably supported by a cam bearing 14 of a cylinder head 11, two eccentric cams 15, 15 being rotation cams axially supported by camshaft 13, a control shaft 16 rotatably supported by the same cam bearing 14 at an upper position of camshaft 13, a pair of rocker arms 18, 18 swingingly supported by control shaft 16 through a control cam 17, and a pair of independent swing cams 20, 20 disposed to upper end portions of intake valves 105, 105 through valve lifters 19, 19, respectively.

Eccentric cams 15, 15 are connected with rocker arms 18, 18 by link arms 25, 25, respectively. Rocker arms 18, 18 are connected with swing cams 20, 20 by link members 26, 26.

Figure 5:
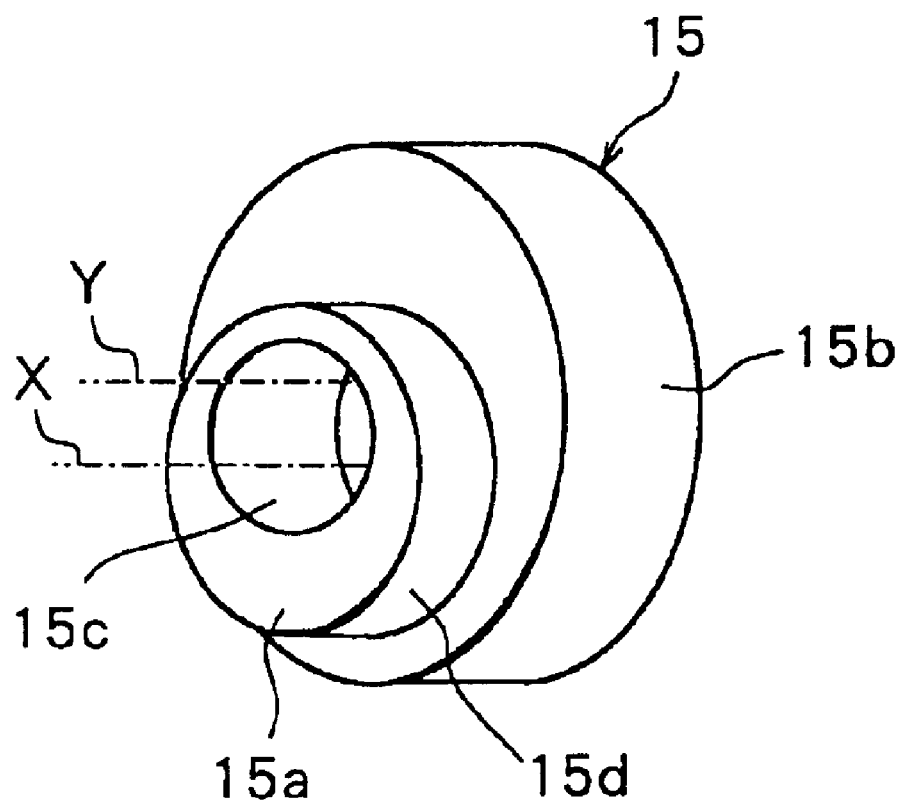
FIG. 5 is a perspective view showing an eccentric cam for use in the VEL.

Each eccentric cam 15, as shown in FIG. 5, is formed in a substantially ring shape and includes a cam body 15a of small diameter, a flange portion 15b integrally formed on an outer surface of cam body 15a. A camshaft insertion hole 15c is formed through the interior of eccentric cam in an axial direction, and also a center axis X of cam body 15a is biased from a center axis Y of camshaft 13 by a predetermined amount.

Eccentric cams 15, 15 are pressed and fixed to both outer sides of camshaft 13 via camshaft insertion holes 15c at positions not interfering with valve lifters 19, 19. Outer peripheral surfaces 15d, 15d of cam bodies 15a, 15a are formed in the same profile.

Each rocker arm 18, as shown in FIG. 4, is bent and formed in a substantially crank shape, and a central base portion 18a thereof is rotatably supported by control cam 17.

A pin hole 18d is formed through one end portion 18b which is formed to protrude from an outer end portion of base portion 18a. A pin 21 to be connected with a tip portion of link arm 25 is pressed into pin hole 18d. A pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to a periphery of control shaft 16. As shown in FIG. 2, a center axis P1 position of control cam 17 is biased from a center axis P2 position of control shaft 16 by α.

Figure 6:
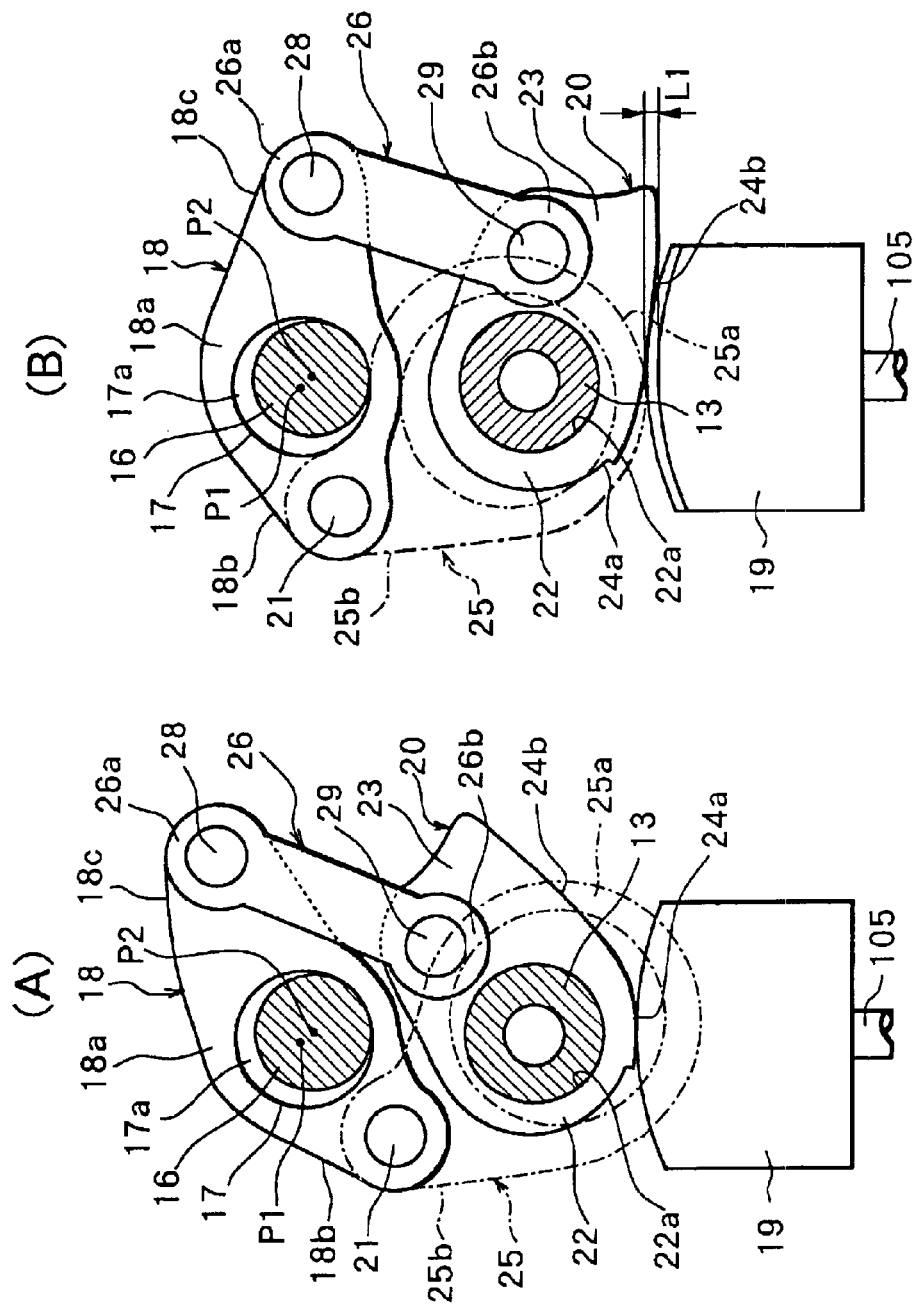
FIG. 6A and FIG. 6B are cross section views showing an operation of the VEL at a low lift condition (B—B cross section view of FIG. 3).
Figure 7:
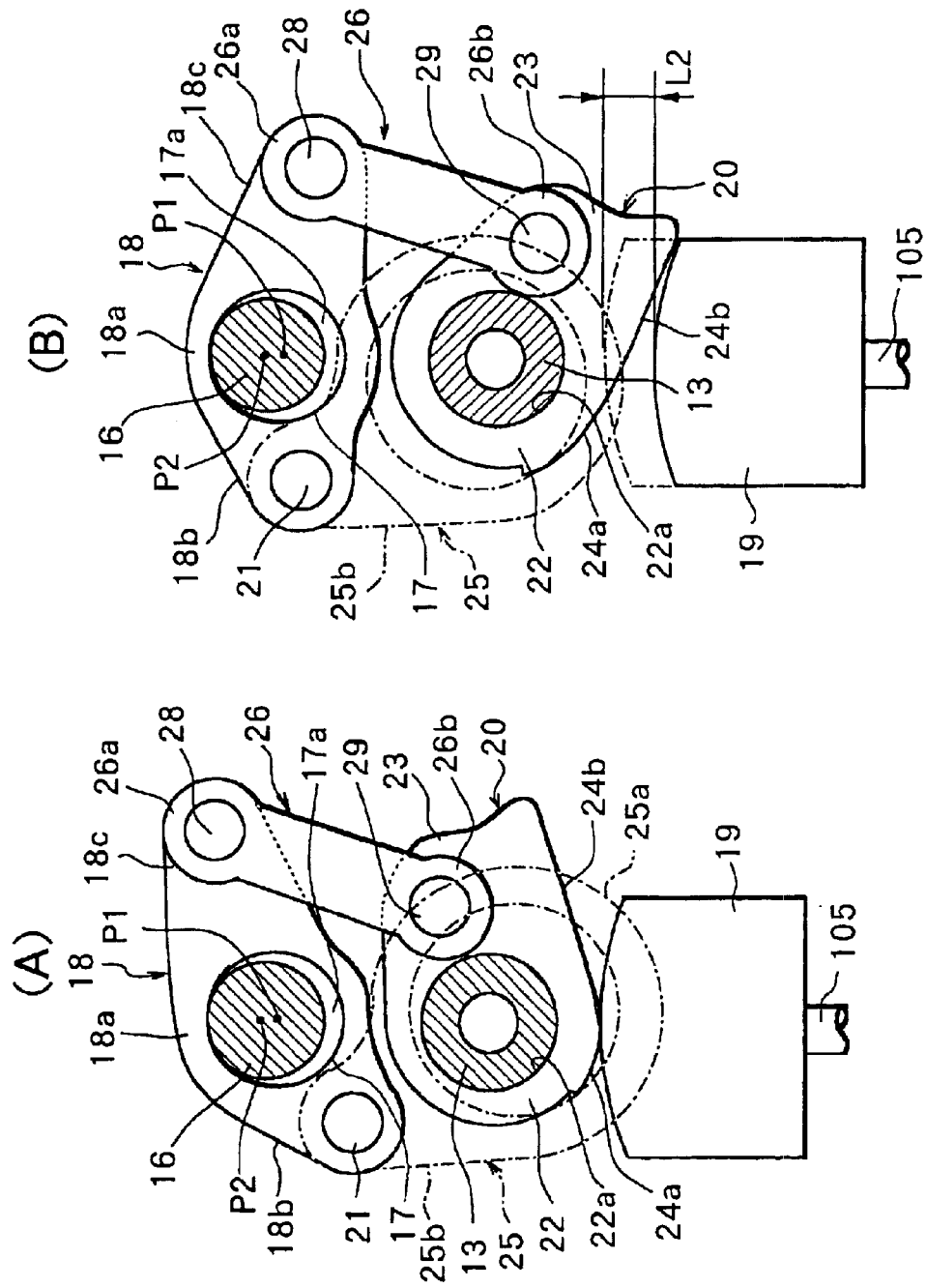
FIG. 7A and FIG. 7B are cross section views showing an operation of the VEL at a high lift condition (B—B cross section view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into base end portion 22 to be rotatably supported. Also, a pin hole 23a is formed through an end portion 23 positioned at the other end portion 18c of rocker arm 18.

A base circular surface 24a of base end portion 22 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20.

Figure 8:
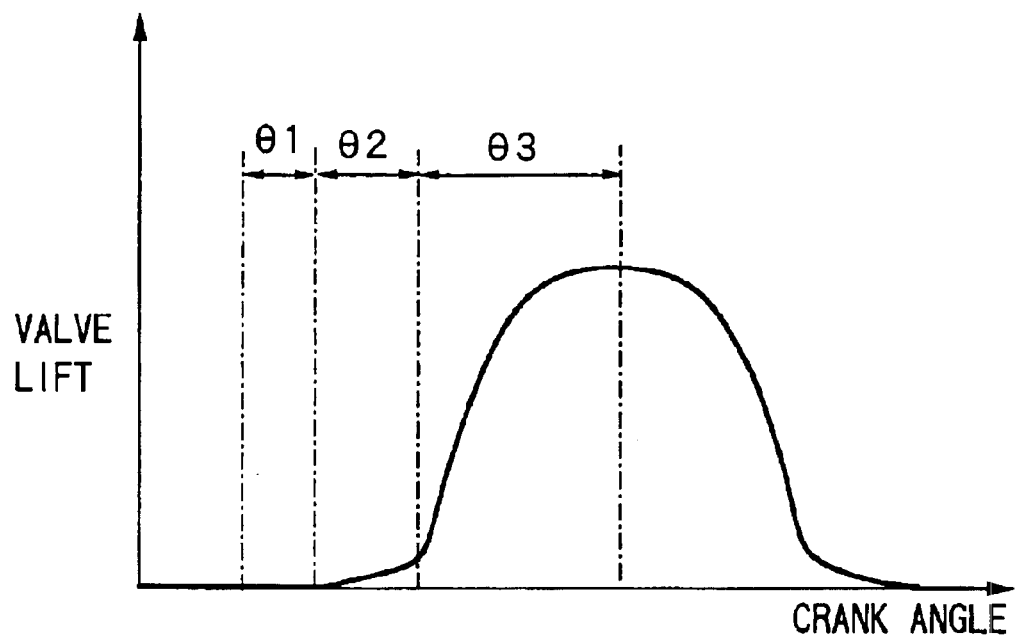
FIG. 8 is a valve lift characteristic diagram corresponding to a base end face and a cam surface of a swing cam in the VEL.

Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped base portion 25a and a protrusion end 25b protrudingly formed on a predetermined position of an outer surface of base portion 25a. A fitting hole 25c to be rotatably fitted with the outer surface of cam body 15a of eccentric cam 15 is formed on a central position of base portion 25a. Also, a pin hole 25d into which pin 21 is rotatably inserted is formed through protrusion end 25b.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d. Snap rings 30, 31, 32 restricting axial transfer of link arm 25 and link member 26 are disposed on respective end portions of pins 21, 28, 29.

In such a constitution, depending on a positional relation between the center axis P2 of control shaft 16 and the center axis P1 of control cam 17, as shown in FIG. 6 and FIG. 7, it is possible to vary the valve lift amount, and by driving control shaft 16 to rotate, the position of the center axis P2 of control shaft 16 relative to the center axis P1 of control cam 17 is changed.

Figure 9:
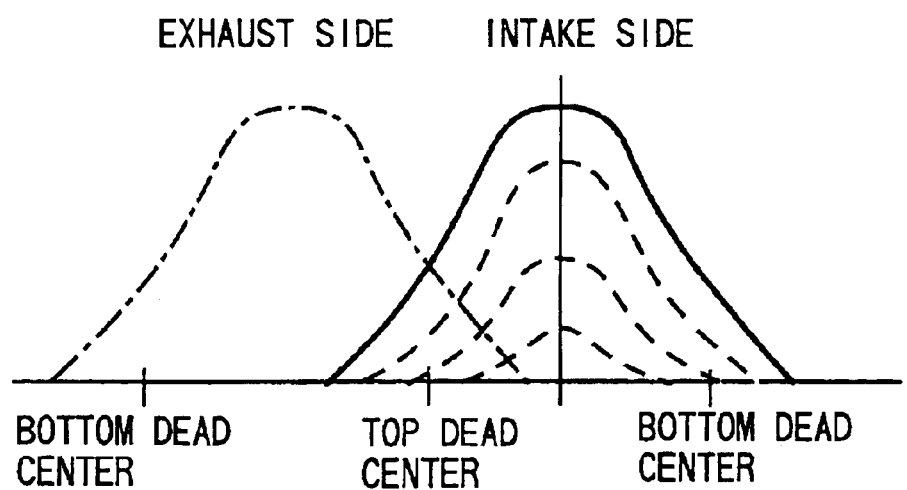
FIG. 9 is a characteristic diagram showing valve timing and valve lift of the VEL.

Control shaft 16 is driven to rotate within a predetermined angle range by a DC servo motor (actuator) 201 disposed at one end portion thereof. By varying an operating angle of control shaft 16 by DC servo motor 201, the valve lift amount and valve operating angle of each of intake valves 105, 105 are successively varied (refer to FIG. 9).

Figure 10:
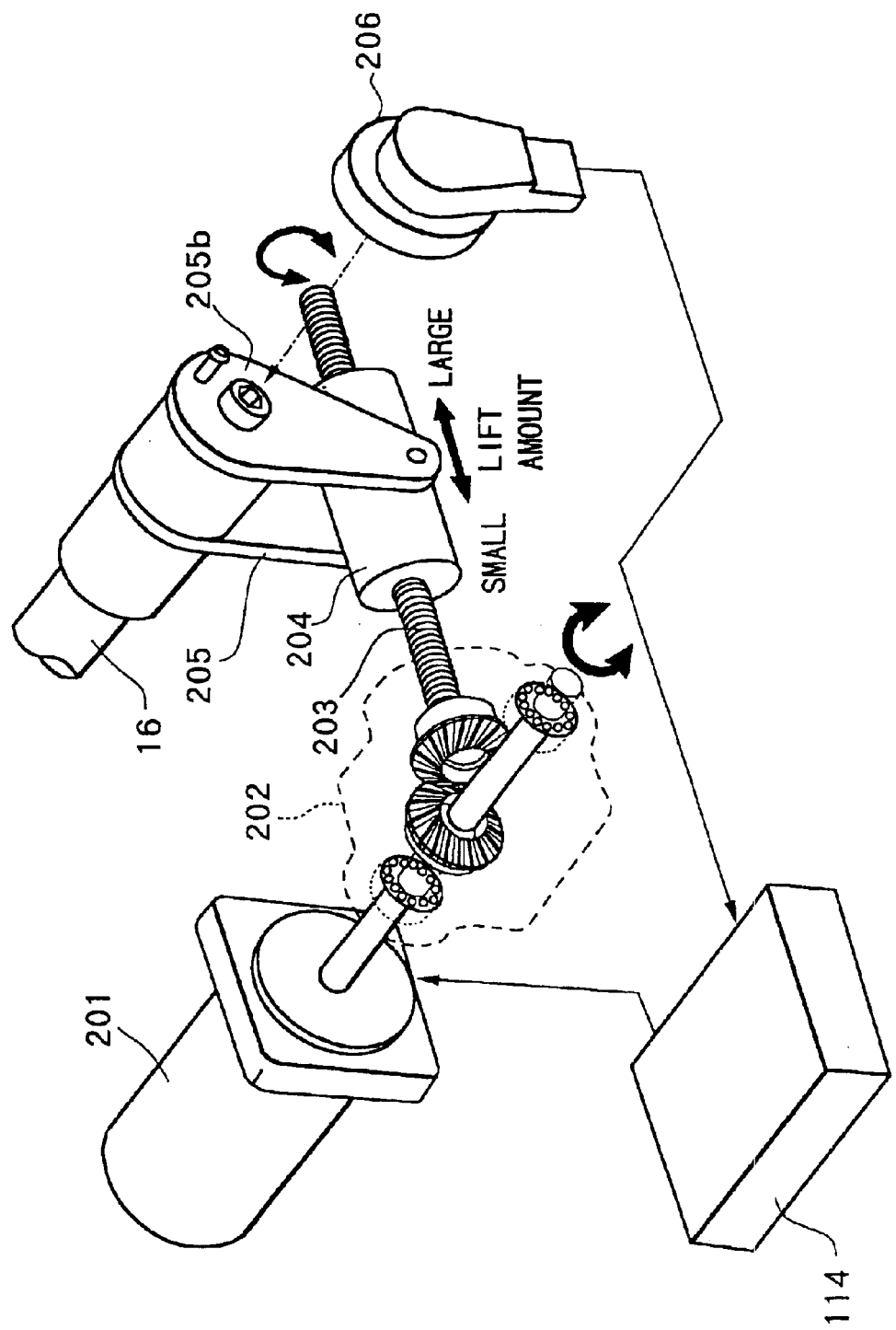
FIG. 10 is a perspective view showing a rotational driving mechanism of a control shaft in the VEL.

That is, in FIG. 10, the rotation of actuator (DC servo motor) 201 is transmitted via a transmission member 202 to a threaded shaft 203, and then, shaft 203 is rotated. When shaft 203 is rotated, an axial position of a nut 204 engaged with shaft 203 is changed. As a result, a pair of stay members 205a, 205b attached to the tip portion of control shaft 16 with one ends thereof being fixed to nut 204 are rotated so that control shaft 16 is rotated.

In the present embodiment, the valve lift amount is decreased by bringing the position of nut 204 closer to transmission member 202, while the valve lift amount is increased by getting the position of nut 124 away from transmission member 202.

Further, a potentiometer type operating angle sensor 206 detecting the operating angle VCS-ANGL of control shaft 16 (that is, VEL 112) is disposed on the tip portion of control shaft 16, as shown in FIG. 10. C/U 114 feedback controls DC servo motor (actuator) 201 so that an actual operating angle detected by operating angle sensor 206 coincides with a target operating angle TGVEL.

On the other hand, as VTC 113, there can be used a known variable valve timing mechanism constituted to change a rotation phase of a camshaft relative to a crankshaft. Therefore, although the detailed description thereof will be omitted here, there is known a variable valve timing mechanism as disclosed in Japanese Unexamined Patent Publication No. 2001-041013 in which a guide plate formed with a spiral guide with which a sliding portion of a link arm is engaged is relatively rotated by a braking force of an electromagnetic brake, to change the rotation phase of the camshaft, or a variable valve timing mechanism constituted to change a relative rotation position of a vane relative to a housing by an oil pressure, to change the rotation phase of the camshaft.

In the constitution as mentioned in the above, there will be described an intake air amount control executed by C/U 114, more specifically, a control on electronically controlled throttle 104, VEL 112 and VTC 113.

Figure 11:
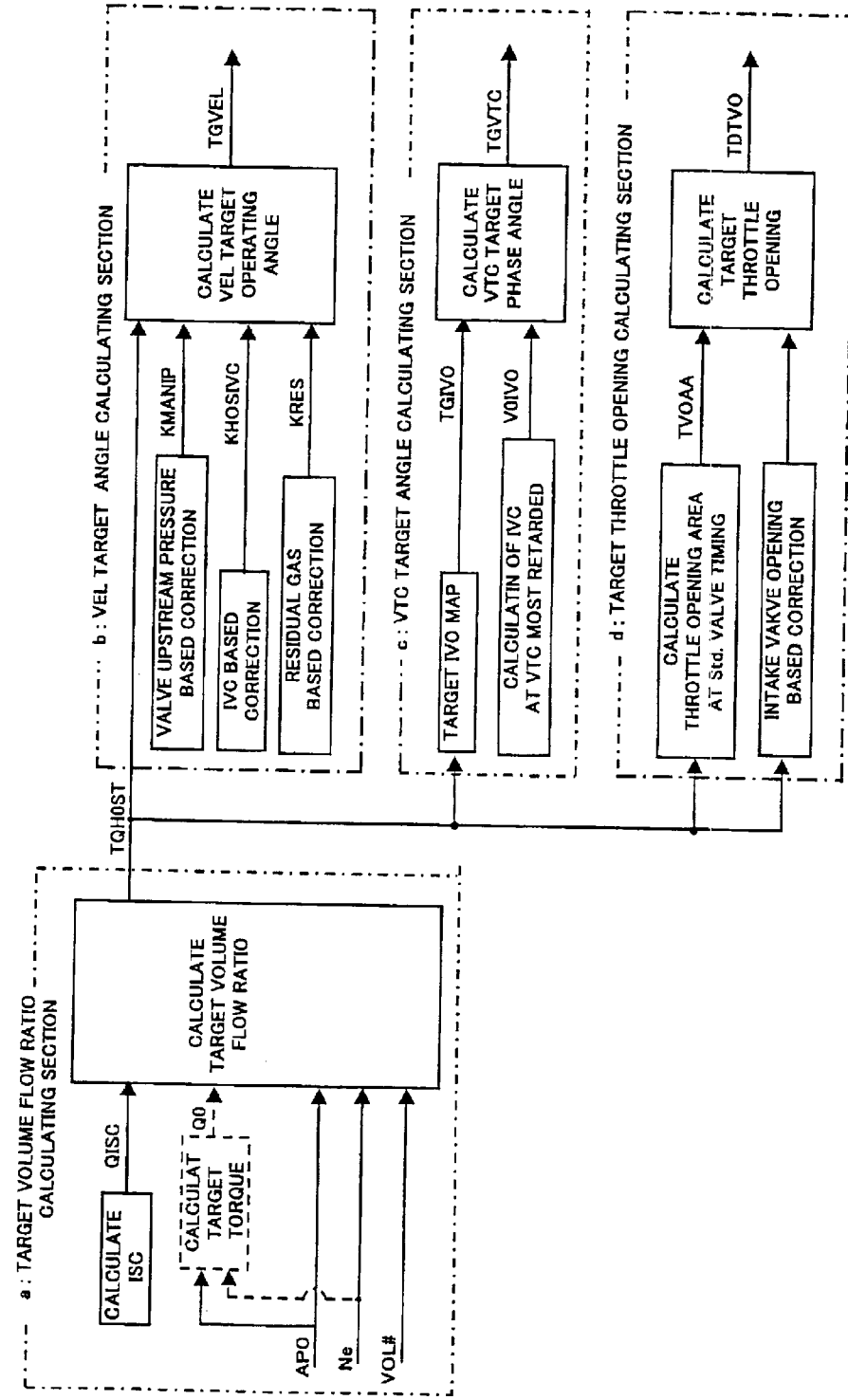
FIG. 11 is an entire block diagram showing an intake air amount control in the embodiment.

FIG. 11 shows an entire block diagram showing an intake air amount control. As shown in FIG. 11, C/U 114 includes a target volume flow ratio calculating section "a", a VEL target operating angle calculating section "b", a VTC target angle calculating section "c" and a target throttle opening calculating section "d".

(a) Calculation in Target Volume Flow Ratio Calculating Section "a"

The target volume flow ratio calculating section "a" calculates a target volume flow ratio TQ0ST equivalent to a target torque of the engine.

To be specific, a requested engine air amount Q0 corresponding to accelerator opening APO and engine rotation speed Ne is calculated, and also a requested ISC air amount QISC requested in an idle rotation speed control (ISC) is calculated.

Then, requested engine air amount Q0 is added with requested ISC air amount QISC to calculate the total requested air amount Q(=Q0+QISC). The resultant total requested air amount Q is divided sequentially by engine rotation speed Ne and a discharge amount (total cylinder volume) VOL# to calculate target volume flow ratio TQH0ST (=Q/(Ne·VOL#)) in intake valve 105.

(b) Calculation in VEL Target Angle Calculating Section "b"

The VEL target operating angle calculating section "b" calculates a volume flow ratio TQH0VEL to be realized in VEL 112, by executing a valve upstream pressure based correction, an IVC based correction (correction according to closing timing of intake valve 105) and a residual gas based correction on target volume flow ratio TQH0ST calculated at the target volume flow ratio calculating part "a".

Next, the volume flow ratio TQH0VEL is converted into a target valve opening area TVELAA, to obtain a target operating angle TGVEL0.

Then, target operating angle TGVEL0 and a maximum operating angle VELHLMT of VEL 112 are compared with each other, to set a final VEL target operating angle TGVEL.

In the following, the setting of target operating angle TGVEL of VEL 12 will be described in detail.

(b-1) Setting of Target Operating Angle TGVEL of VEL 112

Figure 12:
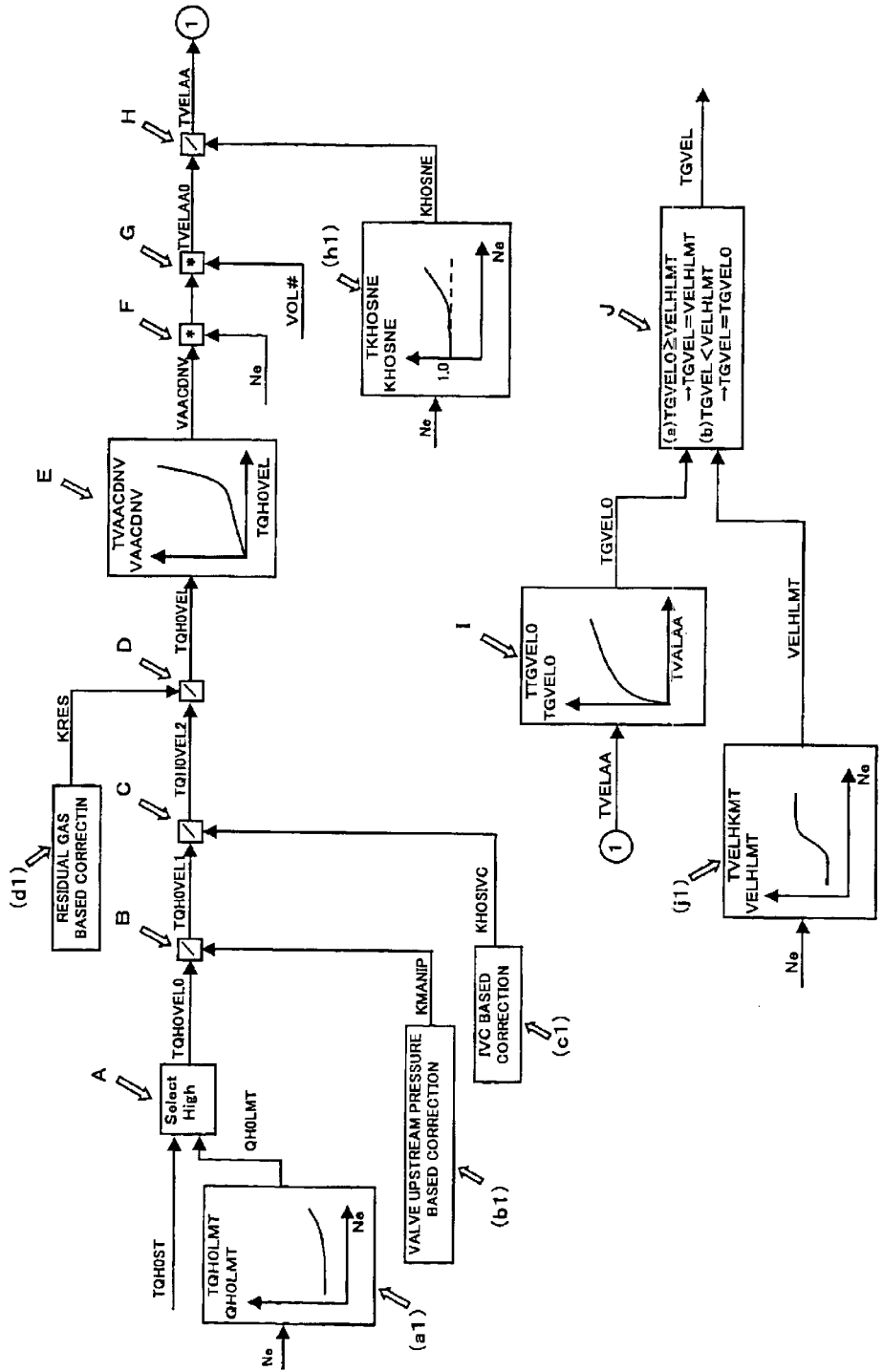
FIG. 12 is a block diagram showing the calculation of a target operating angle TGVEL of the VEL.

FIG. 12 shows a specific control block diagram.

In FIG. 12, at A part, a higher one of target volume flow ratio TQH0ST and a minimum volume flow ratio QH0LMT is selected, to be set as a basic volume flow ratio TQH0VEL0 to be realized in VEL 112. Here, minimum volume flow ratio QH0LMT is the one controllable (realizable) by VEL 112, that is, the volume flow ratio of when the VEL operating angle (VCS-ANGL) is minimum, which is calculated by retrieving a table TQH0LMT as shown in al part in the figure, based on engine rotation speed Ne. Thus, by setting basic volume flow ratio TQH0VEL0 to be realized in VEL 112, an intake air amount control mainly by VEL 112 is executed.

At B part, the valve upstream pressure based correction is executed.

To be specific, basic volume flow ratio TQH0VEL0 is divided by a valve upstream pressure correction value KMANIP which is set at b1 part to obtain TQH0VEL1.

The reason why such a correction is executed is that, since the volume flow amount (intake amount) capable to be sucked is also changed due to a negative pressure generated according to the throttle opening, it is required to set the valve operating characteristic (valve opening area) considering this change in order to ensure a total requested intake amount Q. Consequently, when throttle valve 103b is fully opened, this correction is unnecessary. However, actually, throttle valve 103b is throttled in response to a request of negative pressure for purging and the like, such a correction is necessary. The setting of this valve upstream pressure based correction value KMANIP will be described later (refer to FIG. 13).

At C part, the IVC based correction is executed.

To be specific, volume flow ratio TQH0VEL1 obtained after execution of the valve upstream pressure based correction, is divided by an IVC based correction value KHOSIVC ($\leq 1$) which is set at c1 part according to closing timing (IVC) and valve lift amount of intake valve 105, to obtain TQH0VEL2.

The reason why such a correction is executed is that, when closing timing IVC of intake valve 105 is advanced, since effective cylinder volume is decreased to change the intake amount, it is required to set the valve operating characteristic considering this decrease (=Vcyl of when intake valve is closed (IVC)/Vcyl at BDC) in order to ensure total requested intake amount Q.

Further, another reason why such a correction is executed is that, since a "valve lift amount-intake amount characteristic" in a region where the valve lift amount is significantly low is different from that in another region, in order to ensure total requested intake amount Q, the valve operating characteristic needs to be set considering this difference. The setting of this IVC based correction value KHOSIVC will be described later (refer to FIG. 14).

At D part, the residual gas based correction is executed.

Volume flow ratio TQH0VEL2 obtained after executions of the valve upstream pressure based correction and the IVC based correction, is divided by a residual gas based correction value KRES which is set at d1 part according to a residual gas amount to obtain TQH0VEL.

Note, TQH0VEL calculated here is the volume flow ratio to be realized in VEL 112 (to be referred to hereunder as VEL realizing volume flow amount).

The reason why such a correction is executed is that, if the residual gas amount is increased, since the intake amount is decreased even with the same effective cylinder volume, it is required to set the valve operating characteristic considering this decrease in order to ensure total requested intake amount Q.

Figure 15:
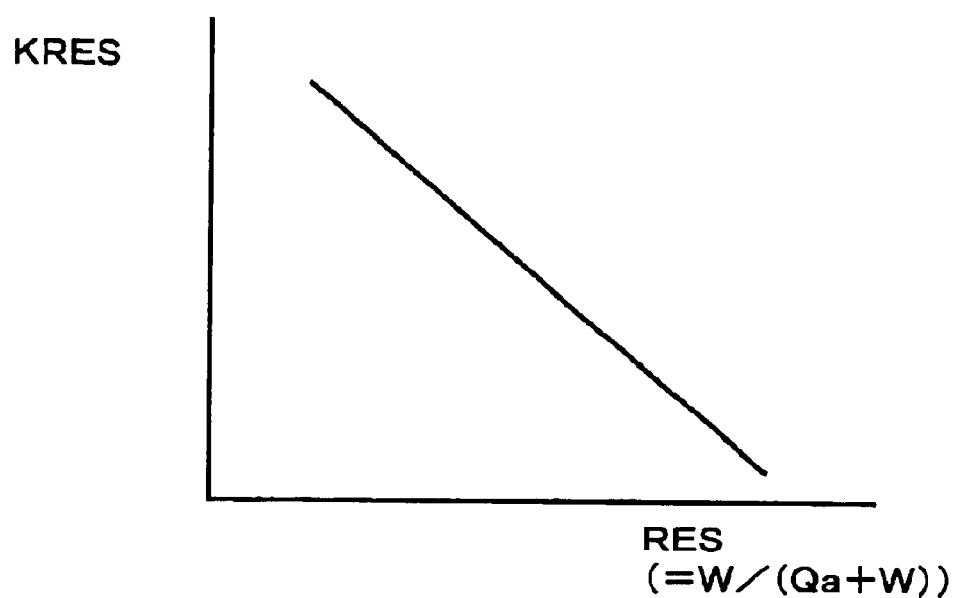
FIG. 15 is a diagram showing one example of a table for setting a residual gas based correction value KRES.

Note, residual gas based correction value KRES is calculated such that, based on opening timing (IVO) of intake valve 105, closing timing (EVC) of exhaust valve 107, and engine rotation speed Ne, a residual gas amount W is estimated while considering a valve overlap amount, a residual gas rate RES (=W/(Qa+W)) is calculated based on estimated residual gas amount W and intake air amount Qa, and a table TKRES (refer to FIG. 15) previously set is retrieved based on residual gas rate RES, thereby calculating residual gas based correction value KRES. Further, residual gas amount W may be estimated based on engine rotation speed Ne and either one of opening timing (IVC) of intake valve 105 and closing timing (EVC) of exhaust valve 107.

At E part, a state amount VAACDNV (=Av·Cd/N/VOL#= valve opening area loss coefficient/rotation speed/exhaust amount) equivalent to valve opening area Av is calculated.

To be specific, such a calculation is performed by retrieving a table TVAACDMV as shown in the figure, based on VEL realizing volume flow ratio TQH0VEL.

The above table TVMCDMV is prepared as follows, for example. At first, an air flow amount passing through intake valve 105 (that is, a cylinder intake air amount) Qc (t) (kg/sec) can be represented by equations (1), (2) based on an equation of a one-dimensional steady flow of compressed fluid.

At choke:

$$\frac{Pc}{P0} \leq \left(\frac{2}{\gamma+1}\right)^{\frac{\gamma}{\gamma-1}} \quad (1)$$

$$Qc(t) = \frac{Cd \cdot Av \cdot P0}{\sqrt{R \cdot T0}} \sqrt{\gamma} \left(\frac{2}{\gamma-1}\right)^{\frac{\gamma+1}{2(\gamma-1)}}$$

At no choke:

$$Qc(t) = \frac{Cd \cdot Av \cdot P0}{\sqrt{R \cdot T0}} \left(\frac{Pc}{P0}\right)^{\frac{1}{\gamma}} \sqrt{\frac{2\gamma}{\gamma-1}\left(1-\left(\frac{Pc}{Pm}\right)^{\frac{\gamma-1}{\gamma}}\right)} \quad (2)$$

In the above equations,

R: a gas constant (=287) [J/(Kg·K)], $\gamma$: a ratio of specific heat (=1.4), Cd: an intake valve flow loss coefficient, Av: intake valve opening area (m$^2$), P0: an intake valve upstream pressure (for example, intake manifold pressure PM) (Pa), Pc: an intake valve downstream pressure (that is, cylinder pressure) (Pa): and T0: an intake valve upstream temperature (for example, an intake manifold temperature Tm) (K).

VEL realizing volume flow ratio TQH0VEL is obtained by dividing the air amount passing through intake valve 105 by engine rotation speed Ne and discharge amount VOL#. Therefore, it can be also represented by equations (3) and (4).

At choke:

$$\frac{Pc}{P0} \leq \left(\frac{2}{\gamma+1}\right)^{\frac{\gamma}{\gamma-1}} \quad (3)$$

$$TQH0VEL = \frac{Cd \cdot Av \cdot P0}{Ne \cdot VOL\# \cdot \sqrt{R \cdot T0}} \sqrt{\gamma} \left(\frac{2}{\gamma-1}\right)^{\frac{\gamma+1}{2(\gamma-1)}}$$

At no choke:

$$TQH0VEL = \frac{Cd \cdot Av \cdot P0}{Ne \cdot VOL\# \cdot \sqrt{R \cdot T0}} \left(\frac{Pc}{P0}\right)^{\frac{1}{\gamma}} \sqrt{\frac{2\gamma}{\gamma-1}\left(1-\left(\frac{Pc}{P0}\right)^{\frac{\gamma-1}{\gamma}}\right)} \quad (4)$$

Consequently, since VEL realizing volume flow ratio TQH0VEL becomes, at choke time, from the equation (3), a value corresponding to Cd·Av/(Ne·VOL#) and a differential pressure ratio (Pc/P0) between fore and after the intake valve, and becomes, at no choke time, from the equation (4), a value proportional to Cd·Av/(Ne·VOL#), the table TVMCDMV is prepared by obtaining in advance a correlation between TQH0VEL and Cd·Av/(Ne·VOL#) by the simulation, experiment or the like.

Then, state amount VMDCNV calculated at E part is multiplied by engine rotation speed Ne at F part, and further multiplied by discharge amount VOL# at G part, to calculate a flow amount characteristic TVELAA0 (=Av·Cd). Calculated flow amount characteristic TVELAA0 corresponds to an opening area equivalent value requested for the intake valve (to be referred to as requested valve opening area hereafter).

At H part, a valve opening area rotating correction is executed.

Specifically, calculated requested valve opening area TVELAA0 is divided by a VEL opening area rotating correction value KHOSNE, to calculate TVELAA.

The reason why such a correction is executed is that, from the property of VEL 112, an inertial force is increased if engine rotation speed Ne becomes a constant value or above, resulting in that the valve lift amount (that is, valve opening area) is increased even with the same VEL operating angle, and therefore, valve opening area is accurately calculated considering the increase.

Note, VEL opening area rotating correction value KHOSNE is calculated by retrieving, a table TKHOSNE as shown in h1 part of the figure, based on engine rotation speed Ne.

Then, calculated TVELAA is a target valve opening area equivalent value (to be referred to as target valve opening area hereunder) of intake valve 105.

At I part, using a conversion table TTGVEL0 (valve opening area-valve operating angle conversion table) as shown in the figure, target valve opening area TVELAA is converted into a VEL operating angle TGVEL0.

That is, since VEL operating angle can be primarily obtained from valve opening area, by previously setting conversion table TTGVEL0, valve opening area can be readily converted into VEL operating angle. Note, it is assumed that table TTGVEL0 includes a valve flow loss coefficient Cd.

At J part, converted VEL operating angle TGVEL0 is compared with an upper limit value of VEL operating angle, that is, maximum VEL operating angle, VELHLMT capable of controlling the intake air amount in VEL 112, to set a VEL target operating angle TGVEL.

Specifically, as shown in the figure, if TGVEL0 ≧ VELHLMT, VELHLMT is set as VEL target operating angle TGVEL. If TGVEL0 < VELHLMT, TGVEL0 is set as VEL target operating angle TGVEL. Maximum VEL operating angle VELHLMT is calculated by retrieving a table TVELHLMT previously set as shown in j1 part of the figure based on engine rotation speed Ne.

Then, C/U 114 controls VEL 112, so that an actual VEL operating angle (VCS-ANGL) reaches VEL target operating angle (TGVEL). As a result, it is possible to realize utmost the intake air amount control by VEL 112 while keeping the volume efficiency at the maximum.

(b-2) Setting of Valve Upstream Pressure Based Correction Value KMANIP

There will be described the setting of valve upstream pressure based correction value KMANIP to be used at b1 part of FIG. 12.

First, it is required to establish the following equations (5) and (6) from the equation of the one-dimensional steady flow of compressed fluid, in order to keep the air amount passing through intake valve 105 constant even if the valve upstream pressure (intake manifold pressure) is changed (this change is Pm0 to Pm1) by throttling throttle valve 103b.

At choke:

$$\frac{Cd0 \cdot Av0 \cdot Pm0}{\sqrt{R \cdot Tm}} \cdot \sqrt{\gamma} \cdot \left(\frac{2}{\gamma-1}\right)^{\frac{\gamma+1}{2(\gamma-1)}} = \frac{Cd1 \cdot Av1 \cdot Pm1}{\sqrt{R \cdot Tm}} \cdot \sqrt{\gamma} \cdot \left(\frac{2}{\gamma-1}\right)^{\frac{\gamma+1}{2(\gamma-1)}} \quad (5)$$

At no choke:

$$\frac{Cd0 \cdot Av0 \cdot Pm0}{\sqrt{R \cdot Tm}} \cdot \left(\frac{Pc0}{Pm0}\right)^{\frac{1}{\gamma}} \cdot \sqrt{\frac{2\gamma}{\gamma-1}\left(1-\left(\frac{Pc0}{Pm0}\right)^{\frac{\gamma-1}{\gamma}}\right)} = \quad (6)$$

$$\frac{Cd1 \cdot Av1 \cdot Pm1}{\sqrt{R \cdot Tm}} \cdot \left(\frac{Pc1}{Pm1}\right)^{\frac{1}{\gamma}} \cdot \sqrt{\frac{2\gamma}{\gamma-1}\left(1-\left(\frac{Pc1}{Pm1}\right)^{\frac{\gamma-1}{\gamma}}\right)}$$

In the above equations,
Pm0: valve upstream pressure at the time when throttle valve is fully opened (intake manifold pressure substantially equals atmospheric pressure),
Pm1: valve upstream pressure at the time of target Boost (intake manifold pressure),
Pc0: valve downstream pressure at the time when throttle valve is fully opened (substantially equals cylinder pressure),
Pc1: valve downstream pressure at the time of target Boost (substantially equals cylinder pressure),
Av0: intake valve opening area at the time when throttle valve is fully opened, and
Av1: intake valve opening area at the time of target Boost.

Accordingly, valve upstream pressure based correction value KMANIP relative to valve opening area Av0 at the time when the valve upstream pressure equals the atmospheric pressure (Pm0) may be represented by the following equations (7) and (8).

At choke time:

$$KMANIP = \frac{Cd0 \cdot Av0}{Cd1 \cdot Av1} = \frac{Pm1}{Pm0} \quad (7)$$

At no choke:

$$KMANIP = \frac{Cd0 \cdot Av0}{Cd1 \cdot Av1} = \frac{Pm1 \cdot \left(\frac{Pc1}{Pm1}\right)^{\frac{1}{\gamma}} \cdot \sqrt{\left(1-\left(\frac{Pc1}{Pm1}\right)^{\frac{\gamma-1}{\gamma}}\right)}}{Pm0 \cdot \left(\frac{Pc0}{Pm0}\right)^{\frac{1}{\gamma}} \cdot \sqrt{\left(1-\left(\frac{Pc0}{Pm0}\right)^{\frac{\gamma-1}{\gamma}}\right)}} \quad (8)$$

Namely, valve upstream pressure based correction value KMANIP is primarily determined by "target Boost (manifold pressure)/the atmospheric pressure" at choke time. Further, even at no choke time, since it is considered that (Pc0/Pm0) substantially equals (Pc1/Pm1), "target Boost/the atmospheric pressure" becomes dominative.

In either of the cases, valve upstream pressure based correction value KMANIP can be made "target Boost/the atmospheric pressure".

Figure 13:
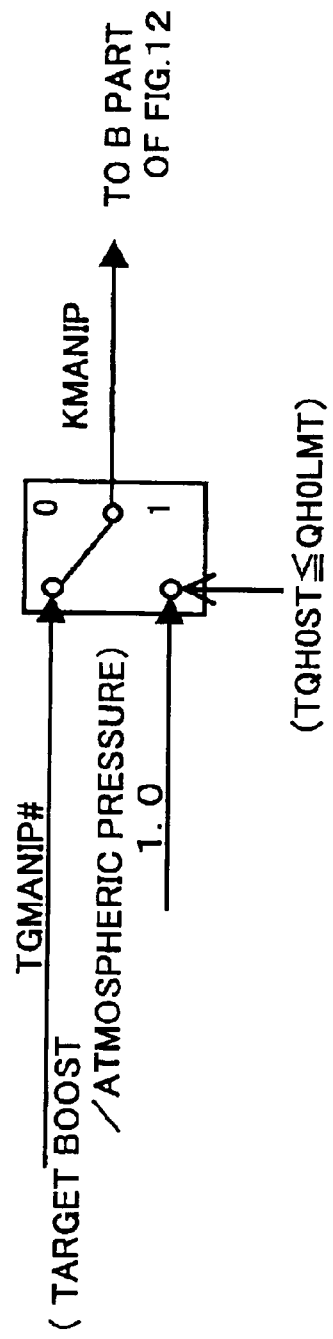
FIG. 13 is a block diagram showing the setting of a valve upstream pressure based correction value KMANIP.

Therefore, in this embodiment, as shown in FIG. 13, "target Boost (target manifold pressure)/the atmospheric pressure" is set by a constant (for example, 88 Kpa/101.3 Kpa) as valve upstream pressure based correction value KMANIP, to be output to B part in FIG. 12. However, in the case where target volume flow TQH0ST is equal to or less than minimum volume flow ratio QH0LMT, that is in the case where minimum volume flow ratio QH0LMT is selected at A part in FIG. 12, regardless of the value upstream pressure, 1.0 is output to B part in FIG. 12 as valve upstream pressure based correction value KMANIP so that the valve operating angle equivalent to minimum volume flow ratio QH0LMT can be finally obtained.

(b-3) Setting of IVC Based Correction Value KHOSIVC

There will be described the setting of IVC based correction value KHOSIVC executed at c1 part in FIG. 12.

The setting of IVC based correction value KHOSIVC in the present embodiment is executed such that, first a valve timing correction value HIVC ($\leq$) is calculated based on closing timing IVC of intake valve 105, and also a valve lift amount correction value HLIFT ($\geq 1$) is calculated based on the valve lift amount of intake valve 105, and valve timing correction value HIVC is multiplied by valve lift amount correction value HLIFT, to set IVC based correction value KHOSIVC. Such setting will be described in accordance with a control block diagram in FIG. 14.

Figure 14:
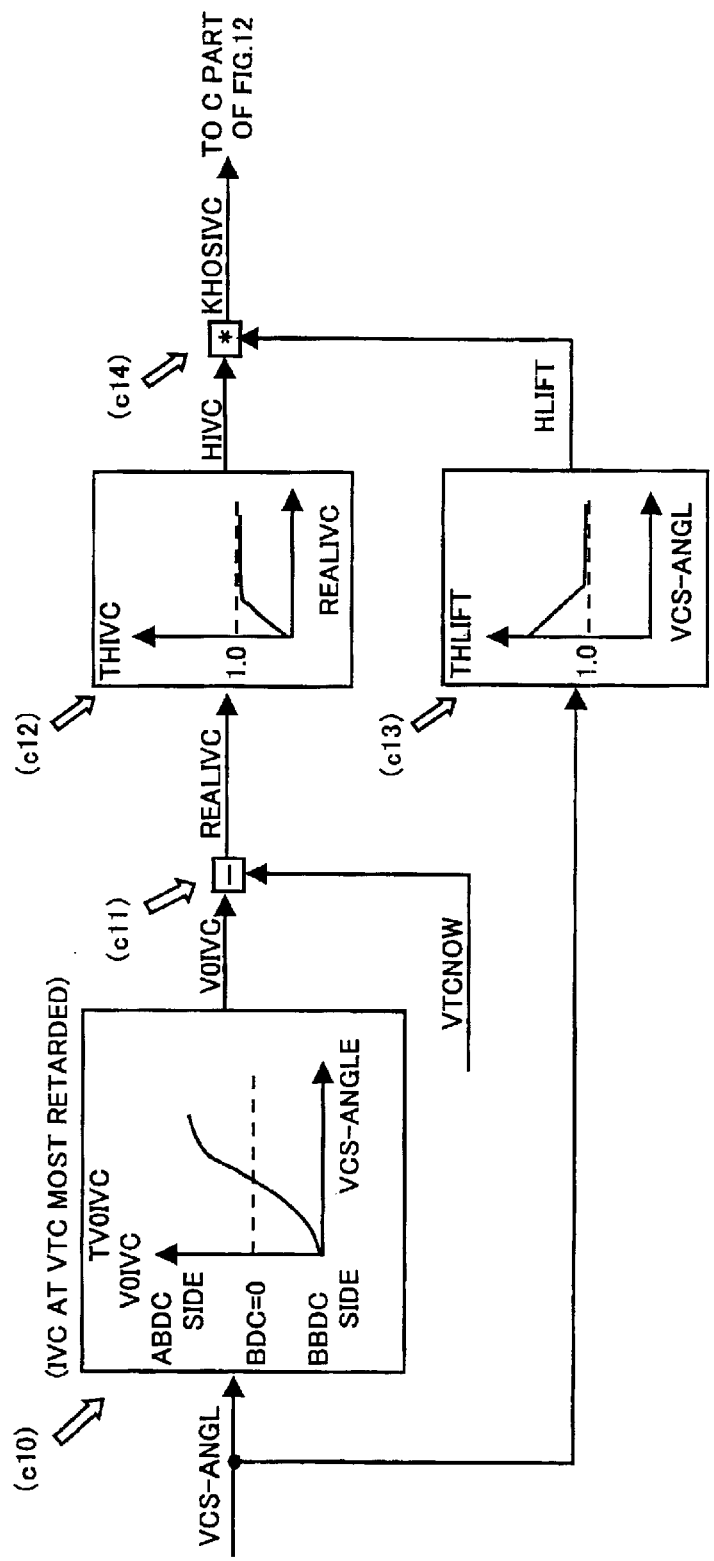
FIG. 14 is a block diagram showing the setting of an IVC based correction value KHOSIVC.

In FIG. 14, at c10 part, a table TV0IVC previously set is retrieved based on operating angle VCS-ANGL of VEL 112, to calculate closing timing V0IVC (IVC angle) of intake valve 105 at the time when VTC 113 does not operate (that is, at VTC most retarded).

At c11 part, a rotation phase VTCNOW of an intake side camshaft (that is, the operating angle of VTC 113) is subtracted from calculated V0IVC, to calculate actual closing timing REALIVC (actual IVC angle) of intake valve 105.

At c12 part, based on calculated actual closing timing REALIVC, a table THIVC as shown in the figure is retrieved, to calculate valve timing correction value HIVC ($\leq 1$) corresponding to closing timing of intake valve 105. Note, as indicated in table THIVC, valve timing correction value HIVC is set to be smaller as closing timing IVC is further advanced, so that basic volume flow ratio TQH0VEL0 is increasingly corrected.

On the other hand, at c13 part, based on operating angle VCS-ANGL of VEL 112, a table THLFT as shown in the figure is retrieved, to calculate valve lift amount correction value HLIFT ($\geq 1$) corresponding to the valve lift amount of intake valve 105. Note, as indicated in table THLIFT, valve lift amount correction amount HLIFT is set to be larger as the valve lift amount is lower in a region where the valve lift amount is less than a predetermined amount (for example, a value obtained in advance by experiment or the like as a valve lift amount which cannot ensure the linearity of "valve lift amount-intake amount characteristic"), so that basic volume flow ratio TQH0VEL0 is decreasingly corrected.

Then, at c14 part, valve timing correction value HIVC is multiplied by valve lift amount correction value HLIFT, and the multiplication result is set as IVC based correction value KHOSIVC to be output to C part of FIG. 12.

Above described valve timing correction value HIVC may includes a correction accompanying valve overlap (for example, a correction according to opening timing IVO of intake valve 105), in addition to the above correction (the correction of decrease of cylinder volume).

Further, in the present invention, valve timing correction value HIVC and valve lift amount correction value HLIFT are calculated independently based on different tables in order to avoid complexity of table preparation. However, these values may be calculated based on one table prepared by combining the different tables.

(c) Calculation in VTC Target Phase Angle Calculating Section "c"

In a VTC target phase angle calculating section "c", since an Nox decrease amount is determined based on opening timing (IVC) or valve overlap amount of intake valve 105, there is previously prepared a map allotted with target IVO or a target valve overlap amount based on a requested NOx decrease amount for each operating region, and target IVO or target valve overlap amount is calculated referring to this map, thereby setting a VTC target phase angle TGVTC while considering VEL target operating angle TGVEL.

Such calculation will be described in detail referring to FIG. 16. In the present embodiment, since VTC 113 is provided only on the intake side, target IVO of intake valve 105 is calculated based on the map described above.

Figure 16:
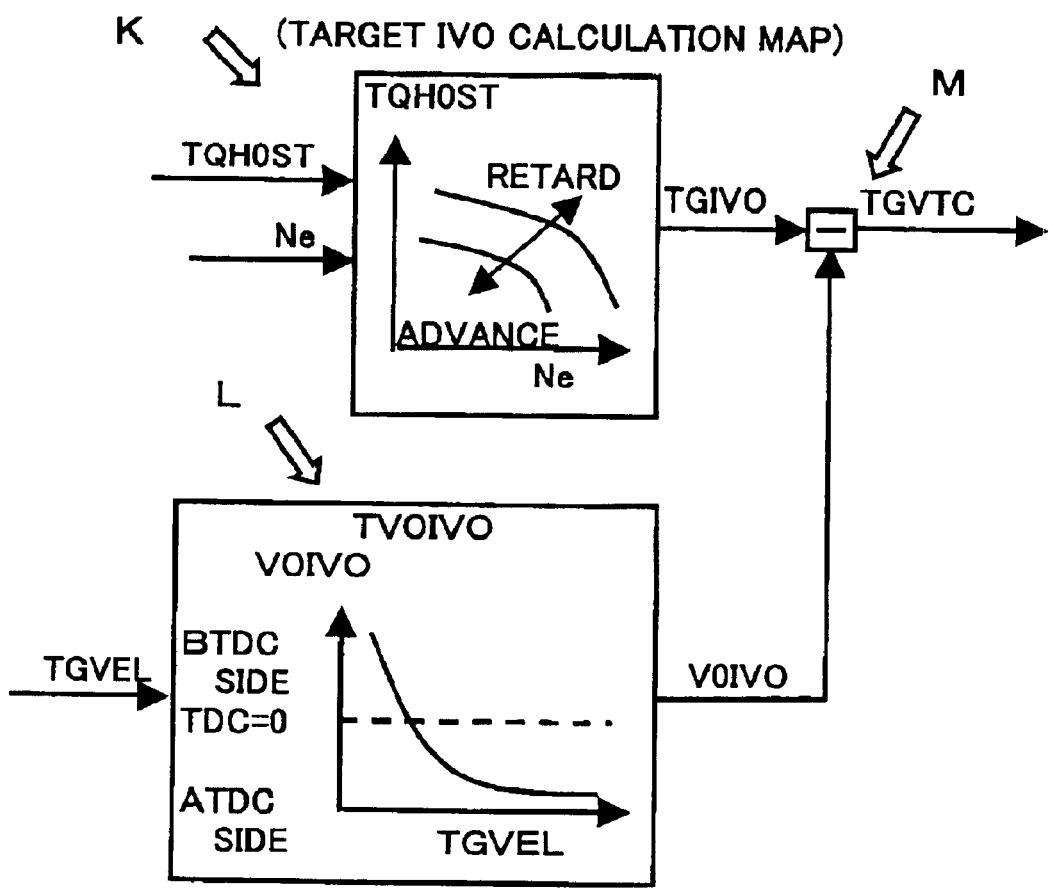
FIG. 16 is a block diagram showing the calculation of a target operating angle of a VTC serving as a variable valve mechanism.

In FIG. 16, at K part, target opening timing TGIVO of intake valve 105 is calculated referring to an IVO map previously set, based on target volume flow ratio TGOHST and engine rotation speed Ne.

At L part, a table TV0IVO previously set is retrieved based on VEL target operating angle TGVEL, to calculate opening timing V0IVO of intake valve 105 at the VTC most retarded time in the case where VEL 112 is controlled at VEL target operating angle TGVEL.

At M part, opening timing V0IVO at the VTC most retarded time is subtracted from target opening timing TGIVO, to calculate VTC target phase angle TGVTC of VTC 113 considering the case where VEL 112 is controlled at VEL target operating angle TGVEL.

Then, C/U 114 controls VTC 113 so that actual VTC phase angle VTCNOW reaches VTC target phase angle TGVTC. Thus, it is possible to perform both of the intake air amount control and the decreasing of NOx.

(d) Calculation in Target Throttle Opening Calculating Section "d"

In a target throttle opening calculating section "d", an opening area TVOAA0 of throttle valve 103b, which is requested when intake valve 105 has a standard valve operating characteristic (in this embodiment, the valve operating characteristic of when VEL 112 does not operate), (to be referred to as requested throttle opening area hereafter) is calculated, and corrected in accordance with an actual change in valve operating characteristic of intake valve 105, to calculate a target throttle opening area TVOAA.

Then, target throttle opening TDTVO is set based on calculated target throttle opening area TVOAA.

(d-1) Setting of Target Throttle Opening TDTVO

Figure 17:
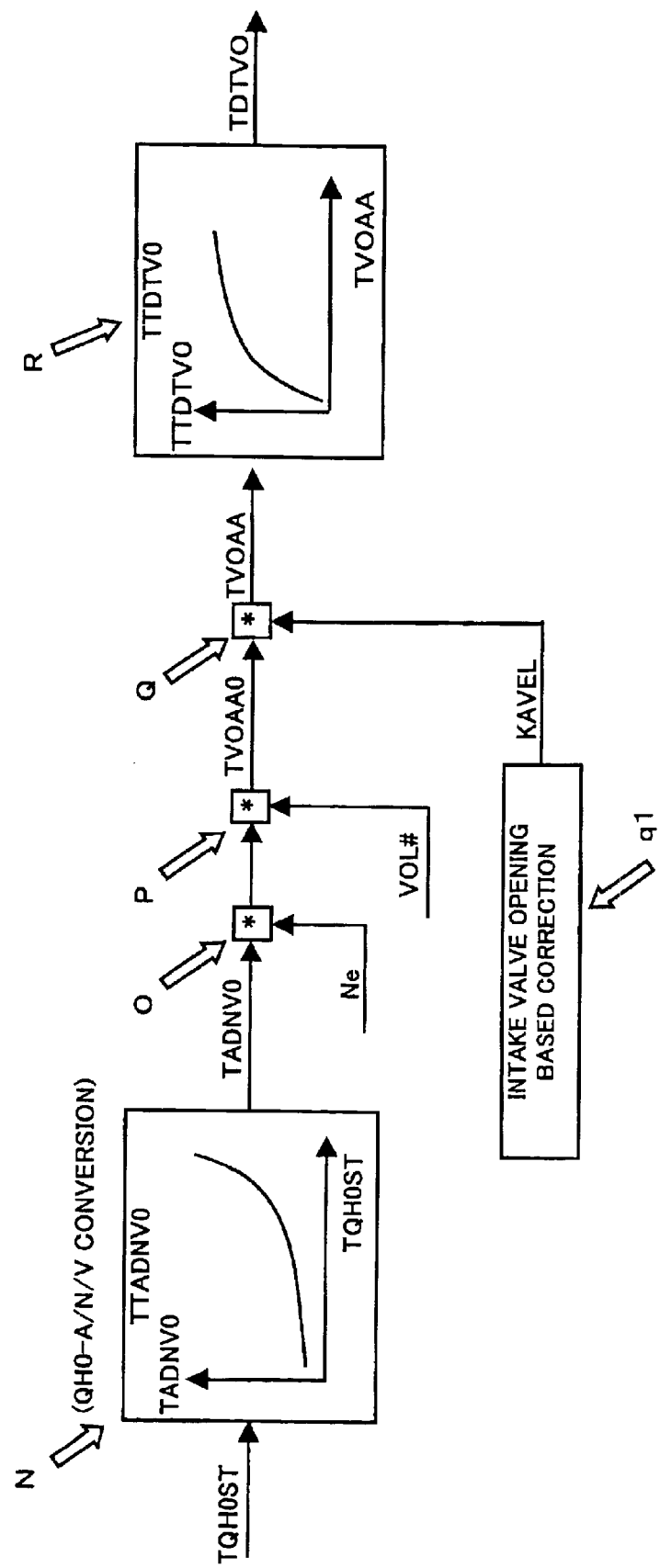
FIG. 17 is a block diagram showing the setting of a target throttle opening.

FIG. 17 is a control block diagram.

In FIG. 17, at N part, a state amount TADNV0 equivalent to an opening area At of throttle valve requested at the standard valve operating characteristic is calculated.

Specifically, TADNV0 is calculated by retrieving a conversion table TTADNV0 previously set, based on target volume flow ratio TQH0ST. This state amount TADNV0 is represented by TADNV0=At/(Ne·VOL#) when the throttle opening area is At, the engine rotation speed is Ne, and the discharge amount (cylinder volume) is VOL#.

Then, calculated TADNV0 is multiplied by engine rotation speed Ne at O part, and further multiplied by discharge amount VOL# at P part, to calculate requested throttle opening area TVOAA0 at standard valve operating characteristic.

At Q part, a correction according to a change in operating characteristic of intake valve 105 is executed on calculated requested throttle opening area TVOAA0.

Specifically, requested throttle opening area TVOAA0 is multiplied by an intake valve opening based correction value KAVEL calculated at q1 part, to calculate target throttle opening area TVOAA. The setting of intake valve opening based correction value KAVEL will be described later (refer to FIG. 18).

At R part, target throttle opening TDTVO is calculated by retrieving a conversion table TTVOAA previously set, based on calculated target throttle opening area TVOAA.

Then, C/U 114 controls electronically controlled throttle 104 so that actual opening of throttle valve 103b converges at target throttle opening TDTVO. Thus, it is possible to perform accurately the control in which VEL 112 and throttle valve 103b are cooperative with each other.

(d-2) Calculation of intake valve opening based correction value KAVEL

The setting of intake valve opening based correction value KAVEL calculated at q1 part of FIG. 17 will be described.

At first, air flow amount Qth (t) (kg/sec) passing through throttle valve 103b can be represented by the following equations (9) and (10) from the equation of the one-dimensional steady flow of compressed fluid.

At choke time:

$$\frac{Pc}{Pm} \leq \left(\frac{2}{\gamma+1}\right)^{\frac{\gamma}{\gamma-1}} \quad (9)$$

$$Qth(t) = \frac{At \cdot Pa}{\sqrt{R \cdot Ta}} \sqrt{\gamma} \left(\frac{2}{\gamma-1}\right)^{\frac{\gamma+1}{2(\gamma-1)}}$$

At no choke:

$$Qth(t) = \frac{At \cdot Pa}{\sqrt{R \cdot Ta}} \left(\frac{Pm}{Pa}\right)^{\frac{1}{\gamma}} \sqrt{\frac{2\gamma}{\gamma-1}\left(1-\left(\frac{Pm}{Pa}\right)^{\frac{\gamma-1}{\gamma}}\right)} \quad (10)$$

In the above equations,

Pa: atmospheric pressure (Pa), Pm: manifold pressure (Pa),

Ta: outside air temperature (K), and At: throttle opening area ($m^2$).

Thereby, in order to keep air flow amount Qth (t) constant even if the operating characteristic of intake valve 105 is changed (from state 0 to state 1), the following equation (11) is required to be established.

$$\frac{At0 \cdot Pa}{\sqrt{R \cdot Ta}}\left(\frac{Pm0}{Pa}\right)^{\frac{1}{\gamma}}\sqrt{\frac{2\gamma}{\gamma-1}\left(1-\left(\frac{Pm0}{Pa}\right)^{\frac{\gamma-1}{\gamma}}\right)} = \quad (11)$$

$$\frac{At1 \cdot Pa}{\sqrt{R \cdot Ta}}\left(\frac{Pm1}{Pa}\right)^{\frac{1}{\gamma}}\sqrt{\frac{2\gamma}{\gamma-1}\left(1-\frac{Pm1}{Pa}\right)^{\frac{\gamma-1}{\gamma}}}$$

In the above equation,

Pm0: intake manifold pressure at standard valve operating characteristic,

Pm1: intake manifold pressure at the time when VEL operates,

At0: throttle opening area at standard valve operating characteristic, and

At1: throttle opening area at the time when VEL operates.

Accordingly, intake valve opening based correction value KAVEL is represented by the following equation (12).

$$KAVEL = \frac{At1}{At0} = \frac{\left(\frac{Pm0}{Pa}\right)^{\frac{1}{\gamma}}\sqrt{1-\left(\frac{Pm0}{Pa}\right)^{\frac{\gamma-1}{\gamma}}}}{\left(\frac{Pm1}{Pa}\right)^{\frac{1}{\gamma}}\sqrt{1-\left(\frac{Pm1}{Pa}\right)^{\frac{\gamma-1}{\gamma}}}} \quad (12)$$

Figure 18:
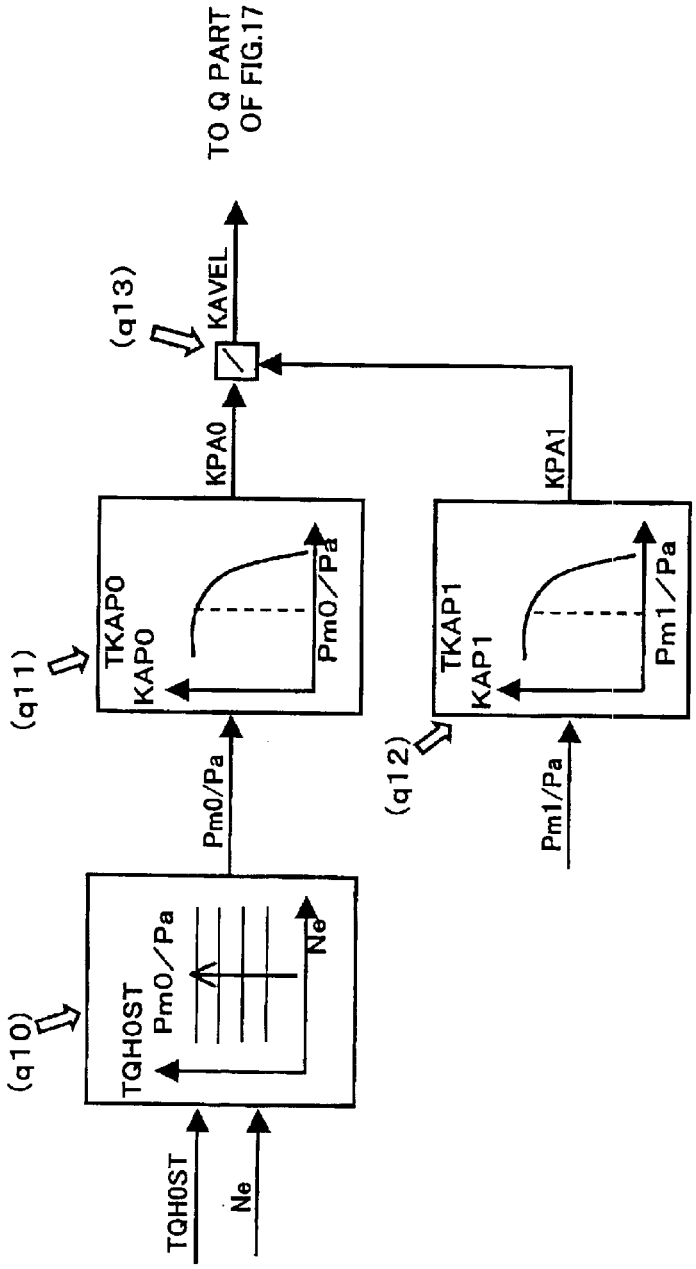
FIG. 18 is a block diagram showing the calculation of an intake valve opening based correction value KAVEL.

Therefore, in the embodiment, at q10 part in FIG. 18, a pressure ratio (Pm0/Pa) at standard valve operating characteristic is obtained by referring to a map previously allotted in performance, based on target volume flow ratio TQH0ST and engine rotation speed Ne.

Then, at q11 part, a coefficient KAP0 is calculated by retrieving a table TBLKAP0 previously set, based on the pressure ratio (Pm0/Pa) at standard valve operating characteristic. Note, this table TKPA0 is set by calculating in advance the following equation (13) and coefficient KPA0 corresponds to the numerator in the equation (12).

$$KAP0 = \left(\frac{Pm0}{Pa}\right)^{\frac{1}{\gamma}}\sqrt{1-\left(\frac{Pm0}{Pa}\right)^{\frac{\gamma-1}{\gamma}}} \quad (13)$$

On the other hand, at q12 part, a coefficient KAP1 is calculated by retrieving a table TBLKAP1 previously set, based on the pressure ratio (Pm1/Pa) at the time when VEL 112 operates. Note, this table TKPA1 is set by calculating in advance the following equation (14) and coefficient KPA1 corresponds to the denominator in the equation (12).

$$KAP1 = \left(\frac{Pm1}{Pa}\right)^{\frac{1}{\gamma}}\sqrt{1-\left(\frac{Pm1}{Pa}\right)^{\frac{\gamma-1}{\gamma}}} \quad (14)$$

The calculation of the pressure ratio (Pm1/Pa) at the time when VEL 112 operates will be described later (refer to FIG. 19).

Then, at q13 part, by dividing coefficient KAP0 by coefficient KAP1, intake valve opening based correction value KAVEL is calculated to be output to Q part of FIG. 17.

(d-3) Calculation of Pressure Ratio (Pm1/Pa) at the Time when VEL Operates

Pressure ratio (Pm1/Pa) at the time when VEL 112 operates, to be used at q12 part of FIG. 18, is calculated in the following manner.

Firstly, an air amount (actual intake air amount) Qacyl sucked into cylinder can be represented by the following equation (15) assumed that a new air rate is $\eta$.

$$Qacyl = \frac{VOL}{T \cdot Ta} \cdot \eta \cdot Pm1 \quad (15)$$

Thus, pressure ratio (Pm1/Pa) becomes the following.

$$\frac{Pm1}{Pa} = \frac{Qacyl \cdot R \cdot Ta}{VOL \cdot \eta \cdot Pa} = \frac{TP}{\eta} \cdot \frac{R \cdot Ta}{VOL \cdot Pa} = \frac{TP}{\eta \cdot TP100} \quad (16)$$

In the above equation, "TP" is an air amount (actual intake air amount) Qacyl sucked in the cylinder, "TP100" is an air amount sucked into the cylinder at the time when throttle valve 103b is fully opened and is calculated by TP100=(VOL·Pa)/(R·Ta). Further, "VOL" is an effective cylinder volume at each valve operating characteristic of intake valve 105.

Accordingly, by obtaining TP, TP100 and new air rate $\eta$, pressure ratio (Pm1/Pa) at the time when VEL operates can be calculated without the necessity of detecting intake manifold pressure Pm.

Figure 19:
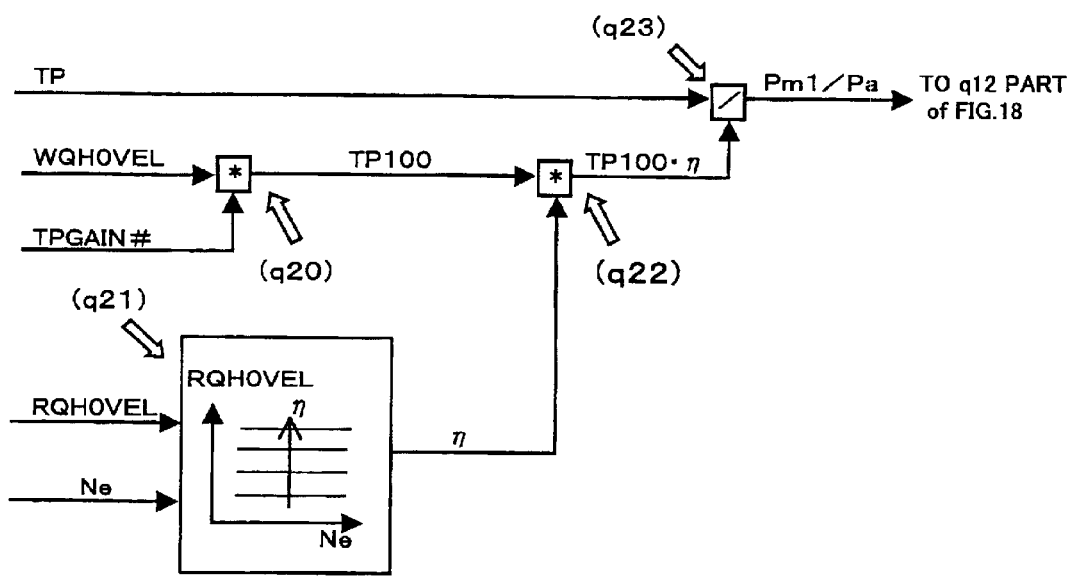
FIG. 19 is a block diagram showing the calculation of a pressure ratio (Pm1/Pa) at the time when the VEL operates.

Therefore, in the embodiment, at q20 part of FIG. 19, a conversion constant TPGAIN# is multiplied on a ratio WQH0VEL of volume flow passed through intake valve 105 (as valve fully opened time volume flow ratio) at each operating characteristic of intake valve 105 at the time when throttle valve 103b is fully opened, to calculate TP100. The calculation of valve fully opened time volume flow ratio WQH0VEL will be described later.

Further, at q21 part, new air rate η is calculated by referring to a map previously allotted in performance, based on a ratio RQH0VEL of volume flow passed through intake valve 105 (actual engine volume flow ratio) at each actual operating characteristic and engine rotation speed Ne. The calculation of actual engine volume flow ratio RQH0VEL will be described later. However, new air rate η is not limited to the one calculated as above, and may be estimated based on operating conditions, for example.

Then, at q22 part, "TP100·η" is calculated, and further, at q23 part, "TP/(TP100·η)" (as described above, this value is pressure ratio (Pm1/Pa) at the time when VEL operates) is calculated to be output to q12 part of FIG. 18. However, at choke time, valve upstream pressure based correction value KMANIP (that is, a constant) may be output (refer to the equation (7)).

Figure 20:
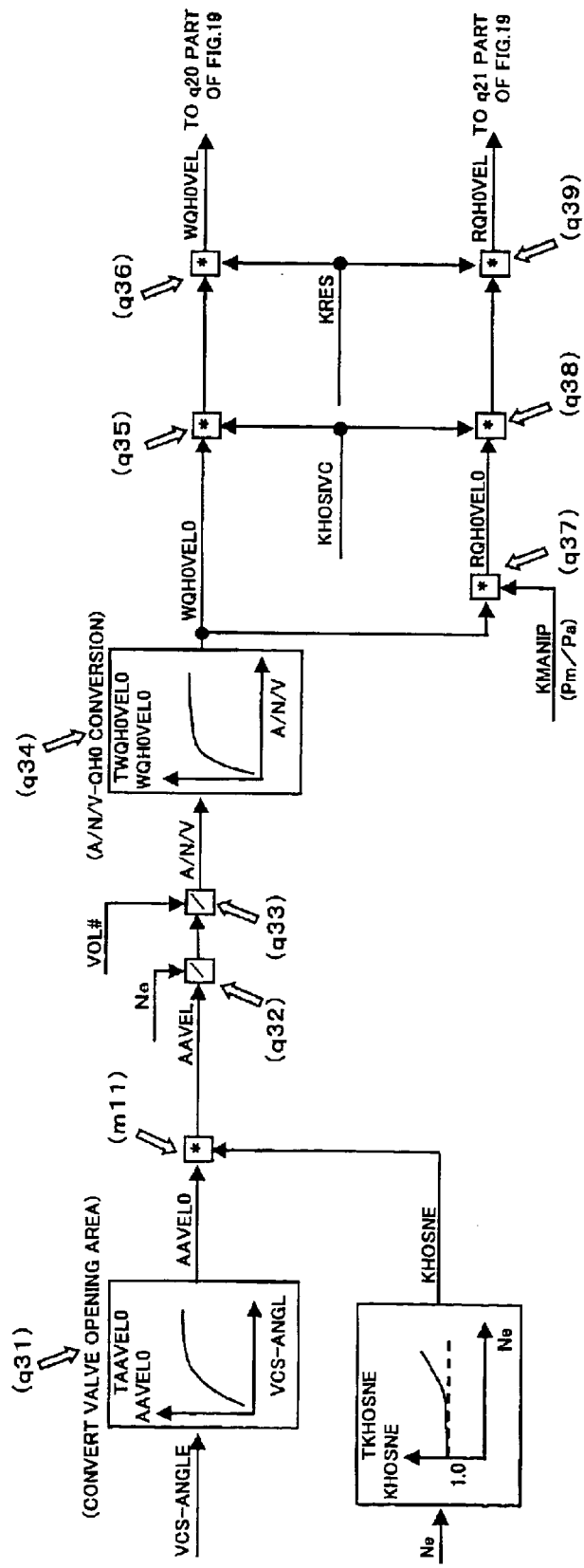
FIG. 20 is a block diagram showing the calculation of a valve fully opened time volume flow ratio WQH0VEL and an actual engine volume flow ratio RQH0VEL.

(d-4) Calculations of Valve Fully Opened Time Volume Flow Ratio WQH0VEL and Actual Engine Volume Flow Ratio RQH0VEL These calculations are performed by obtaining the opening area of intake valve 105 based on operating angle VCS-ANGL of VEL 112 and converting the opening area to the volume flow ratio (FIG. 20 shows a control block diagram).

In FIG. 20, at q30 part, an opening area AAVEL0 of intake valve 105 is calculated by retrieving a table TMVEL0 previously set, based on operating angle VCS-ANGL of VEL 112.

At q31 part, in the same manner as H part in FIG. 12, VEL opening area is rotatingly corrected according to engine rotation speed Ne, to calculate AAVEL.

Calculated AAVEL is divided by engine rotation speed Ne at q32 part, and further divided by discharge amount (cylinder volume) VOL# at q33 part, to be made an A/N/V characteristic.

At q34 part, a table TWQH0VEL0 previously set is retrieved, to convert the A/N/V characteristic into WQH0VEL0.

Then, at q35 part, in the same manner as C part in FIG. 12, the IVC based correction is executed on WQH0VEL0, and subsequently, at q36 part, in the same manner as D part in FIG. 12, the residual gas based correction is executed on WQH0VEL0, to calculate valve fully opened time volume flow ratio WQH0VEL, and the resultant is output to q20 part in FIG. 19.

On the other hand, at q37 part, in the same manner as B part in FIG. 12, the valve upstream pressure based correction is executed on WQH0VEL0 converted at q34 part to obtain RQH0VEL0, and at q38 part and q39 part, the IVC based correction and the residual gas based correction are executed, respectively, to calculate actual engine volume flow ratio RQH0VEL, and the resultant is output to q21 part in FIG. 19.

As described in the above, in this embodiment, a control in which VEL 112 and electronically controlled throttle 104 are cooperative with each other is performed. Therefore, an intake air amount control (torque control) mainly by VEL 112 can be executed. At the same time, to a request of negative pressure which cannot be responded only by VEL, electronically controlled throttle 104 is controlled to realize an optimum control according to operating conditions.

In particular, as features of the present embodiment, when performing the intake air amount control (torque control) by VEL 112, total requested intake amount Q equivalent to the target torque is set as the target volume flow ratio in intake valve 105, this target volume flow ratio is corrected according to the closing timing and valve lift amount of intake valve 105, and then the valve operating characteristic is set based on post corrected target volume flow ratio. Therefore, it is possible to realize the intake air amount control by VEL 112 with high accuracy while considering a change in intake air amount and the like generated depending on valve operating condition (valve opening area) of intake valve 105.

The entire contents of Japanese Patent Application No. 2002-205876 filed Jul. 15, 2002, a priority of which is claimed, are incorporated herein by reference.

What is claimed is:

1. An apparatus for controlling an intake air amount of an internal combustion engine provided with a variable valve mechanism that varies at least a valve operating characteristic of an intake valve, comprising:

an operating condition detecting unit that detects operating conditions of said engine;

a valve operating characteristic detecting unit that detects the valve operating characteristic of said intake valve; and a control unit that sets a target intake air amount equivalent to a target torque according to the operating conditions of the engine, sets a target valve operating characteristic based on the set target intake air amount, and controls said variable valve mechanism so that the valve operating characteristic of said intake valve reaches said target valve operating characteristic, wherein said control unit performs a correction according to a valve lift amount of said intake valve to set said target valve operating characteristic.

2. An apparatus for controlling an intake air amount of an internal combustion engine according to claim 1, wherein said control unit performs said correction according to the valve lift amount of said intake valve in a low valve lift region where the valve lift amount of said intake valve is lower than a predetermined amount.

3. An apparatus for controlling an intake air amount of an internal combustion engine according to claim 1, wherein said control unit performs a correction according to closing timing of said intake valve to set said target valve operating characteristic.

4. An apparatus for controlling an intake air amount of an internal combustion engine according to claim 1, wherein said control unit divides said target intake air amount by an engine rotation speed and total cylinder volume to calculate a target volume flow ratio in said intake valve, converts said target volume flow ratio into an opening area of said intake valve to set as a target valve opening area, and sets said target valve operating characteristic based on said target valve opening area.

5. An apparatus for controlling an intake air amount of an internal combustion engine according to claim 1, wherein said control unit;

in a high valve lift region where the valve lift amount of said intake valve is equal to or larger than a predetermined amount, divides said target intake air amount by an engine rotation speed and total cylinder volume to calculate a target volume flow ratio in said intake valve, performs a first correction according to closing timing of said intake valve on said target volume flow ratio, and sets said target valve operating characteristic based on the target volume flow ratio after said first correction, and in a low valve lift region where the valve lift amount of said intake valve is less than said predetermined amount, further performs a second correction according to the valve lift amount of said intake valve on the target volume flow ratio after said first correction, and sets said target valve operating characteristic based on the target volume flow ratio after said second correction.

6. An apparatus for controlling an intake air amount of an internal combustion engine according to claim 5, wherein in said first correction, said target volume flow ratio is increasingly corrected as closing timing of said intake valve is further advanced, and in said second correction, said target volume flow ratio is decreasingly corrected as the valve lift amount of said intake valve is lower.

7. An apparatus for controlling an intake air amount of an internal combustion engine according to claim 1, wherein said variable valve mechanism comprises:

a drive shaft rotating in synchronism with a crankshaft of the engine;

a drive cam fixed to said drive shaft;

a swing cam swinging to operate said intake valve to open and close;

a transmission mechanism with one end connected to said drive cam side and the other end connected to said swing cam side;

a control shaft having a control cam changing the position of said transmission mechanism; and an actuator rotating said control shaft, and wherein the valve lift amount of said intake valve is successively changed by rotatingly controlling said control shaft by said actuator.

8. An apparatus for controlling an intake air amount of an internal combustion engine provided with a variable valve mechanism that varies at least a valve operating characteristic of an intake valve, comprising:

operating condition detecting means for detecting operating conditions of said engine;

valve operating characteristic detecting means for detecting the valve operating characteristic of said intake valve;

target intake air amount setting means for setting a target intake air amount equivalent to a target torque according to the operating conditions of the engine;

target valve operating characteristic setting means for setting a target valve operating characteristic based on said target intake air amount; and variable valve mechanism control means for controlling said variable valve mechanism so that the valve operating characteristic of said intake valve reaches said target valve operating characteristic, wherein said target valve operating characteristic setting means performs a correction according to the valve lift amount of said intake valve to set said target valve operating characteristic.

9. A method of controlling an intake air amount of an internal combustion engine provided with a variable valve mechanism that varies at least a valve operating characteristic of an intake valve, comprising:

setting a target intake air amount equivalent to a target torque according to detected operating conditions;

performing a correction according to a valve lift amount of said intake valve to set a target valve operating characteristic of said intake valve for ensuring said target intake air amount; and controlling said variable valve mechanism so that the valve operating characteristic of said intake valve reaches said target valve operating characteristic.

10. A method of controlling an intake air amount of an internal combustion engine according to claim 9, wherein said correction according to the valve lift amount of said intake valve is performed in a low valve lift region where the valve lift amount of said intake valve is lower than a predetermined amount.

11. A method of controlling an intake air amount of an internal combustion engine according to claim 9, wherein a correction according to closing timing of said intake valve is performed to set said target valve operating characteristic.

12. A method of controlling an intake air amount of an internal combustion engine according to claim 9, wherein said target intake air amount is divided by an engine rotation speed and total cylinder volume to calculate a target volume flow ratio in said intake valve, said target volume flow ratio is converted into an opening area of said intake valve to be set as a target valve opening area, and said target valve operating characteristic is set based on said target valve opening area.

13. A method of controlling an intake air amount of an internal combustion engine according to claim 9, wherein, in a high valve lift region where the valve lift amount of said intake valve is equal to or larger than a predetermined amount, said target intake air amount is divided by an engine rotation speed and total cylinder volume to calculate a target volume flow ratio in said intake valve, a first correction according to closing timing of said intake valve is performed on said target volume flow ratio, and said target valve operating characteristic is set based on the target volume flow ratio after said first correction, and in a low valve lift region where the valve lift amount of said intake valve is less than said predetermined amount, a second correction according to the valve lift amount of said intake valve is further performed on the target volume flow ratio after said first correction, and said target valve operating characteristic is set based on the target volume flow ratio after said second correction.

14. A method of controlling an intake air amount of an internal combustion engine according to claim 13, wherein in said first correction, said target volume flow ratio is increasingly corrected as closing timing of said intake valve is further advanced, and in said second correction, said target volume flow ratio is decreasingly corrected as the valve lift amount of said intake valve is lower.

15. A method of controlling an intake air amount of an internal combustion engine according to claim 9, wherein said variable valve mechanism comprises:

a drive shaft rotating in synchronism with a crankshaft of the engine;

a drive cam fixed to said drive shaft;

a swing cam swinging to operate said intake valve to open and close;

a transmission mechanism with one end connected to said drive cam side and the other end connected to said swing cam side;

a control shaft having a control cam changing the position of said transmission mechanism; and an actuator rotating said control shaft, and wherein the valve lift amount of said intake valve is successively changed by rotatingly controlling said control shaft by said actuator.

* * * * *